United States Patent
Qiao et al.

(10) Patent No.: US 12,063,550 B2
(45) Date of Patent: *Aug. 13, 2024

(54) MULTIPLE ACCESS POLICY CONTROL

(71) Applicant: Ofinno, LLC, Reston, VA (US)

(72) Inventors: Weihua Qiao, Herndon, VA (US); Esmael Hejazi Dinan, McLean, VA (US); Kyungmin Park, Vienna, VA (US); Jinsook Ryu, Oakton, VA (US); Peyman Talebi Fard, Vienna, VA (US); Taehun Kim, Fairfax, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/200,974

(22) Filed: May 23, 2023

(65) Prior Publication Data

US 2023/0328593 A1    Oct. 12, 2023

Related U.S. Application Data

(63) Continuation of application No. 17/335,908, filed on Jun. 1, 2021, now Pat. No. 11,700,549, which is a
(Continued)

(51) Int. Cl.
*H04W 28/08*  (2023.01)
*H04W 60/04*  (2009.01)
(Continued)

(52) U.S. Cl.
CPC ... *H04W 28/0933* (2020.05); *H04W 28/0967* (2020.05); *H04W 60/04* (2013.01);
(Continued)

(58) Field of Classification Search
CPC ............. H04W 28/0933; H04W 76/30; H04W 28/0967; H04W 60/04; H04W 60/06; H04W 84/042
See application file for complete search history.

(56) References Cited

U.S. PATENT DOCUMENTS 11,116,028 B2    9/2021  Salkintzis
11,178,717 B2 *  11/2021  Ha .................... H04W 76/15
(Continued)

FOREIGN PATENT DOCUMENTS

CN    112438074 A      3/2021
CN    112438074 A  *  3/2021  ......... H04L 65/1069
(Continued)

OTHER PUBLICATIONS

3GPP TS 23.501 V16.1.0 (Jun. 2019); Technical Specification; 3rd Generation Partnership Project; Technical Specification Group Services and System Aspects; System Architecture for the 5G System; Stage 2; (Release 16).
(Continued)

*Primary Examiner* — Mehmood B. Khan
(74) *Attorney, Agent, or Firm* — Xin Gao; Kavon Nasabzadeh; Philip R. Smith

(57) ABSTRACT

An access and mobility management function (AMF) of a network receives, from a wireless device, a registration request message. The AMF sends, to the wireless device, a registration accept message comprising an access traffic steering, switching, and splitting (ATSSS) capability indication of the network.

20 Claims, 21 Drawing Sheets

Related U.S. Application Data continuation of application No. PCT/US2020/047598, filed on Aug. 24, 2020.

(60) Provisional application No. 62/890,140, filed on Aug. 22, 2019.

(51) Int. Cl.
*H04W 60/06* (2009.01)
*H04W 76/30* (2018.01)
*H04W 84/04* (2009.01)

(52) U.S. Cl.
CPC ........... *H04W 60/06* (2013.01); *H04W 76/30* (2018.02); *H04W 84/042* (2013.01)

(56) References Cited

U.S. PATENT DOCUMENTS

| | | | |
|---|---|---|---|
| 11,178,725 | B2 | 11/2021 | Talebi Fard et al. |
| 11,483,754 | B2 | 10/2022 | Lai et al. |
| 11,528,763 | B2 | 12/2022 | Youn et al. |
| 2019/0174405 | A1 | 6/2019 | Yang et al. |
| 2019/0208573 | A1 | 7/2019 | Yang et al. |
| 2019/0357294 | A1* | 11/2019 | Ha ..................... H04W 76/15 |
| 2019/0387576 | A1 | 12/2019 | Yang et al. |
| 2019/0394279 | A1 | 12/2019 | Dao et al. |
| 2019/0394833 | A1 | 12/2019 | Talebi Fard et al. |
| 2020/0128432 | A1 | 4/2020 | Youn et al. |
| 2020/0178196 | A1 | 6/2020 | Wang et al. |
| 2020/0221527 | A1 | 7/2020 | Bharatia et al. |
| 2020/0236727 | A1 | 7/2020 | Salkintzis |
| 2020/0260401 | A1* | 8/2020 | So ..................... H04W 76/50 |
| 2020/0389931 | A1* | 12/2020 | Kumar .............. H04W 76/16 |
| 2020/0404609 | A1* | 12/2020 | Huang-Fu .......... H04W 76/15 |
| 2021/0037585 | A1 | 2/2021 | Youn et al. |
| 2021/0045021 | A1* | 2/2021 | Jeong ............... H04W 36/0033 |
| 2021/0092664 | A1 | 3/2021 | Lai et al. |
| 2022/0132454 | A1* | 4/2022 | Youn ................. H04W 76/32 |
| 2022/0167446 | A1* | 5/2022 | Youn ................. H04W 48/18 |
| 2022/0361272 | A1 | 11/2022 | Sugawara |
| 2023/0328593 | A1 | 10/2023 | Qiao et al. |

FOREIGN PATENT DOCUMENTS

| | | | | |
|---|---|---|---|---|
| CN | 113079586 | A | 7/2021 | |
| CN | 113079586 | A * | 7/2021 | ........... H04W 76/12 |
| EP | 3678448 | A1 | 7/2020 | |
| EP | 3442202 | A1 | 2/2021 | |
| EP | 4025012 | A1 | 7/2022 | |
| JP | 2020205520 | A * | 12/2020 | ........... H04W 60/04 |
| JP | 2020205520 | A | 12/2020 | |
| KR | 1020190095220 | | 8/2019 | |
| KR | 10201901242013 | | 11/2019 | |
| KR | 1020200019238 | | 2/2020 | |
| KR | 1020200019259 | | 2/2020 | |
| KR | 1020200021847 | | 2/2020 | |
| KR | 1020200022522 | | 2/2020 | |
| KR | 1020200042447 | | 4/2020 | |
| WO | 2019/032972 | A1 | 2/2019 | |
| WO | WO-2019032972 | A1 * | 2/2019 | ........... H04W 48/18 |
| WO | 2021/170248 | A1 | 9/2021 | |
| WO | WO-2021170248 | A1 * | 9/2021 | ........... H04L 45/24 |

OTHER PUBLICATIONS

3GPP TS 23.502 V16.1.1 (Sep. 2019); Technical Specification; 3rd Generation Partnership Project; Technical Specification Group Services and System Aspects; Procedures for the 5G System; Stage 2; (Release 16).
3GPP TS 23.503 V16.1.0 (Jun. 2019); Technical Specification; 3rd Generation Partnership Project; Technical Specification Group Services and System Aspects; Policy and Charging Control Framework for the 5G System; Stage 2; (Release 16).
3GPP TR 23.726 V16.0.0 (Dec. 2018); Technical Report; 3rd Generation Partnership Project; Technical Specification Group Services and System Aspects; Study on Enhancing Topology of SMF and UPF in 5G Networks; (Release 16).
3GPP TR 23.793 V16.0.0 (Dec. 2018); Technical Report; 3rd Generation Partnership Project; Technical Specification Group Services and System Aspects; Study on access traffic steering, switch and splitting support in the 5G system architecture; (Release 16).
3GPP TS 24.501 V16.1.0 (Jun. 2019); Technical Specification; 3rd Generation Partnership Project; Technical Specification Group Core Network and Terminals; Non-Access-Stratum (NAS) protocol for 5G System (5GS); Stage 3; (Release 16).
S2-180449; SA WG2 Meeting #125; Jan. 22-26, 2018, Gothenburg, Sweden; (revision of S2-17xxxx); Source: InterDigital Inc.; Title: UE Requested Multi-access PDU Session Establishment; Document for: Approval.
S2-1811579; SA WG2 Meeting #129; 9; Oct. 15-19, 2018, Dongguan, P. R. China; (revision of S2-1810980); Source: Ericsson; Title: PCC and N4 handling of ATSSS; Document for: Approval.
S2-181362; SA WG2 Meeting #125; Jan. 22-26, 2018, Gothenburg, SE; Source: Huawei, HiSilicon; Title: New KI and Alternative architecture framework for ATSSS; Document for: Approval; Agenda Item: 6.12; Work Item / Release: FS_ATSSS /Rel-16.
S2-182231; SA WG2 Meeting #126; Feb. 26-Mar. 2, 2018, Montreal, Canada; (revision of S2-18xxxx); Source: ITRI; Title: Update the existing solution to Support of Multi-Access PDU Sessions; Document for: Approval.
S2-182504; SA WG2 Meeting #126; Feb. 26-Mar. 2, 2018, Montreal, Canada; (revision of S2-182121); Source: Motorola Mobility, Lenovo; Title: Update of Solution 2; Document for: Approval; Agenda Item: 6.8; Work Item / Release: FS_ATSSS / Rel-16.
S2-183581; SA WG2 Meeting #127; Sanya, China, Apr. 16-20, 2018; (revision of S2-18xxxx); Source: LG Electronics; Title: URSP Rule and ATSSS Rule; Document for: Approval; Agenda Item: 6.8 Study on Access Traffic Steering, Switch and Splitting support in the 5G system architecture; Work Item / Release: FS_ATSSS / Rel-16.
S2-184120; SA WG2 Meeting #127; Apr. 16-20, 2018, Sanya, P.R.China; (revision of S2-183388); Source: Motorola Mobility, Lenovo; Title: Traffic steering with ATSSS policy; Document for: Approval; Agenda Item: 6.8; Work Item / Release: FS_ATSSS / Rel-16.
S2-184472; SA WG2 Meeting #127; Apr. 16-20, 2018, Sanya, PRC; (revision of S2-184116); Source: Nokia, Nokia Shanghai Bell; Title: Architecture framework with ATSSS rules and UP Access Agnostic Reporting Control Protocol; Document for: Approval; Agenda Item: 6.8; Work Item / Release: FS_ATSSS.
S2-184475; SA WG2 Meeting #127; Apr. 16-20, 2018, Sanya, China; (revision of S2-184121, S2-183361); Source: Huawei, HiSilicon; Title: ATSSS Rule definition and update of TFCP; Document for: Approval; Agenda Item: 6.8; Work Item / Release: FS_ATSSS /Rel-16.
S2-184476; SA WG2 Meeting #127; Sanya, P.R.China, Apr. 16-20, 2018; (revision of S2-184470); Source: BT PLC, Broadcom, Deutsche Telekom; Title: Architectural Updates for ATSSS Solution 1; Document for: Approval; Agenda Item: 6.8 Study on Access Traffic Steering, Switch and Splitting support in the 5G system architecture; Work Item / Release: FS_ATSSS / Rel-16.
S2-185243; SA WG2 Meeting #S2-127BIS; May 28-Jun. 1, 2018, Newport Beach, California, USA; Source: Intel; Title: Solution of ATSSS rule in URSP; Document for: Approval; Agenda Item: 6.8; Work Item / Release: FS_ATSSS/ Rel-16.
S2-1902327; SA WG2 Meeting #131; Feb. 25-Mar. 1, 2019, Santa Cruz, Tenerife, Spain; (rev. S2-1900161, 1732, 2242); CR-Form-v11.2; Change Request; 23.503; CR 0187; rev 3; Current version: 15.4.0; Title: Support of ATSSS rules and URSP rules for MA-PDU Sessions.
S2-1902358; 3GPP TSG-SA WG2 Meeting #131; Santa Cruz, Tenerife, Spain, Feb. 25-Mar. 1, 2019; (revision of S2-1902329); CR-Form-v11.4; Change Request; 23.503; CR 0185; rev 4; Current version: 15.4.0; Title: PCC support for traffic switching, steering and splitting.

(56) References Cited

OTHER PUBLICATIONS

S2-1902360; SA WG2 Meeting #131; Feb. 25-Mar. 1, 2019, Santa Cruz, Tenerife, Spain; (rev. of . . . , 0850, 1701, 2231, 2333); CR-Form-v11.2; Change Request; 23.502; CR 0866; rev 9; Current version: 15.4.1; Title: Introduction of ATSSS Procedures including Multi-Access PDU Session Establishment.
S2-1902966; 3GPP TSG-SA WG2 Meeting #132; Mar. 7-12, 2019 Xian, China; Source: ZTE; Title: Considerations of ATSSS support for 5GS roaming scenarios; Document for: Agreement; Agenda Item: 6.8; Work Item / Release: ATSSS/ Rel-16.
SP-180732; TSG SA Meeting #SP-81; Sep. 12-14, 2018, Gold Coast, Australia; S2-188603; SA WG2 Meeting #128b; Aug. 20-24, 2018, Sophia-Antipolis, France; (revision of S2-187754); Source: SA WG2; Title: Updated SID: Study on Access Traffic Steering, Switch and Splitting support in the 5G system architecture; Document for: Approval; Agenda Item: 17B.4; Work Item / Release: FS_ATSSS / Rel-16.
SP-181124; TSG SA Meeting #SP-82; Dec. 12-14, 2018, Sorrento, Italy; (S2-1812640); Source: SA WG2; Title: New WID: Access Traffic Steering, Switch and Splitting support in the 5G system architecture; Document for: Approval; Agenda Item: 18.
SP-190558; 3GPP TSG SA Meeting#84; Newport Beach California, USA Jun. 5-7, 2019; (revision of SP-190538); Source: ZTE, Motorola Mobility, Lenovo, Thales, ETRI, Apple; Title: New SID: Study Extended Access Traffic Steering, Switch and Splitting support in the 5G system architecture; Document for: Approval; Agenda Item: 6.2.
International Search Report and Written Opinion of the International Searching authority mailed Feb. 4, 2021, in International Application No. PCT/US2020/047598.
S2-1812103; Sa WG2 Meeting #S2-129BIS; Nov. 26-30, 2018, West Palm Beach, USA; Source: Charter Communications, CableLabs; Title: Handover of a PDU session based on network awareness of QoE, for accessing via W-5GCAN—Impacts clarifications and Conclusion proposal; Document for: Approval; Agenda Item: 6. 7; Work Item / Release: FS_5WWC.
3GPP TR 23.793 V0.5.0 (Jun. 2018); Technical Report; 3rd Generation Partnership Project; Technical Specification Group Services and System Aspects; Study on Access Traffic Steering, Switching and Splitting support in the 5G system architecture (Release 16).
3GPP TR 23.793 V16.0.0 (Jun. 2018); Technical Report; 3rd Generation Partnership Project; Technical Specification Group Services and System Aspects; Study on access traffic steering, switch and splitting supportin the 5G system architecture; (Release 16).
Indian Office Action, mailed Jan. 9, 2024, in IN Patent Application No. 202217013124.

* cited by examiner

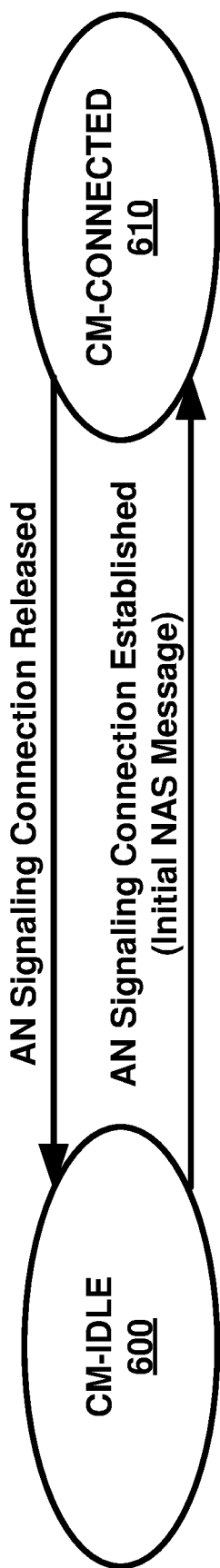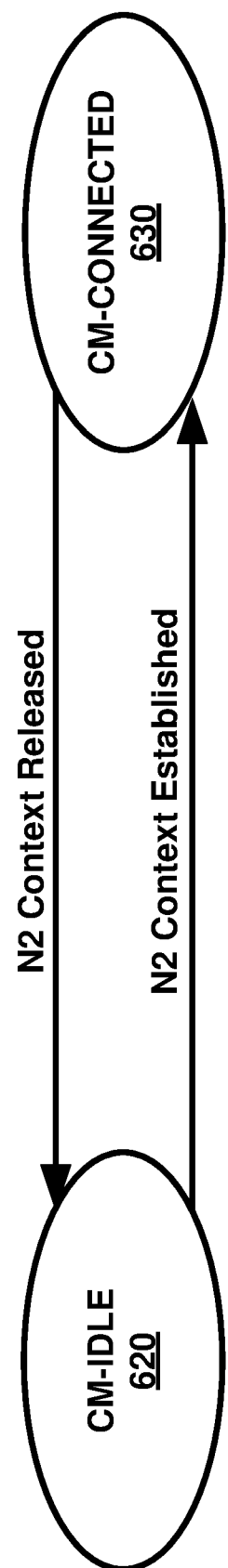
CM State Transition in UE
FIG. 6A
CM State Transition in AMF
FIG. 6B

MULTIPLE ACCESS POLICY CONTROL

CROSS-REFERENCE TO RELATED APPLICATIONS

This application is a continuation of U.S. patent application Ser. No. 17/335,908, filed, Jun. 1, 2021, which is a continuation of International Application No. PCT/US2020/047598, filed Aug. 24, 2020, which claims the benefit of U.S. Provisional Application No. 62/890,140, filed Aug. 22, 2019, all of which are hereby incorporated by reference in their entireties.

BRIEF DESCRIPTION OF THE SEVERAL VIEWS OF THE DRAWINGS

Examples of several of the various embodiments of the present disclosure are described herein with reference to the drawings.

FIG. 6A and FIG. 6B depict two connection management state models in UE 100 and AMF 155 as per an aspect of embodiments of the present disclosure.

DETAILED DESCRIPTION OF EXAMPLES

Example embodiments of the present invention enable implementation of enhanced features and functionalities in 5G systems. More particularly, the embodiments of the technology disclosed herein may relate to multiple accesses (e.g. for 5G or future communication system). Throughout the present disclosure, UE, wireless device, and mobile device are used interchangeably. Throughout the present disclosure, base station, (Radio) Access Network ((R)AN), Next Generation Radio Access Network (NG-RAN), New radio Node B (gNB), Next Generation eNodeB (ng-eNBs) are used interchangeably.

Figure 4:
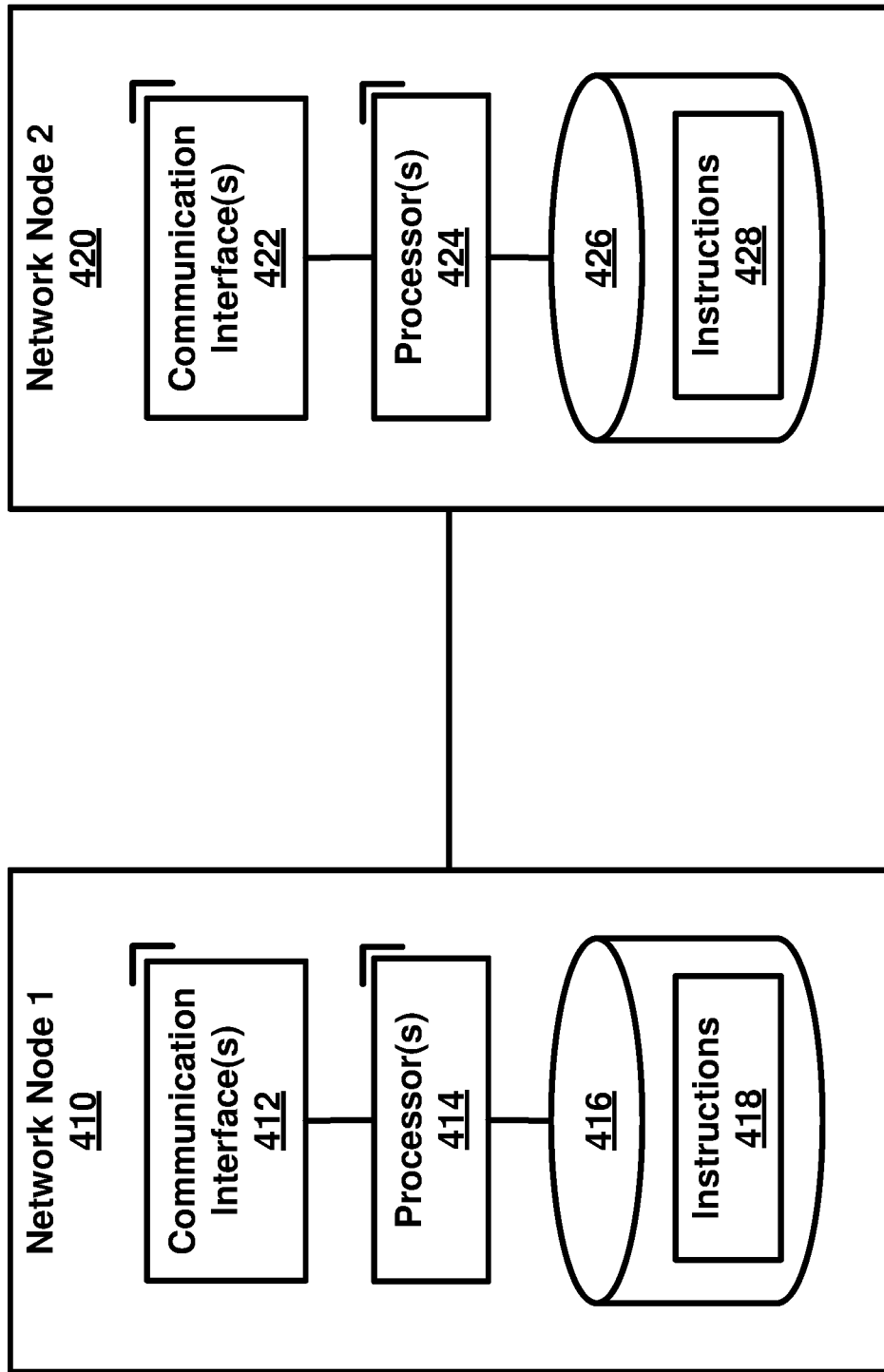
FIG. 4 is a system diagram of an example network nodes as per an aspect of an embodiment of the present disclosure.

Throughout the present disclosure, AMF, PCF, VPCF, HPCF, VSMF, HSMF, VUPF, HUPF are example network functions which may be implemented either as a network element on a dedicated hardware, and/or a network node as depicted FIG. 4, or as a software instance running on a dedicated hardware and/or shared hardware, or as a virtualized function instantiated on an appropriate platform.

Figure 1:
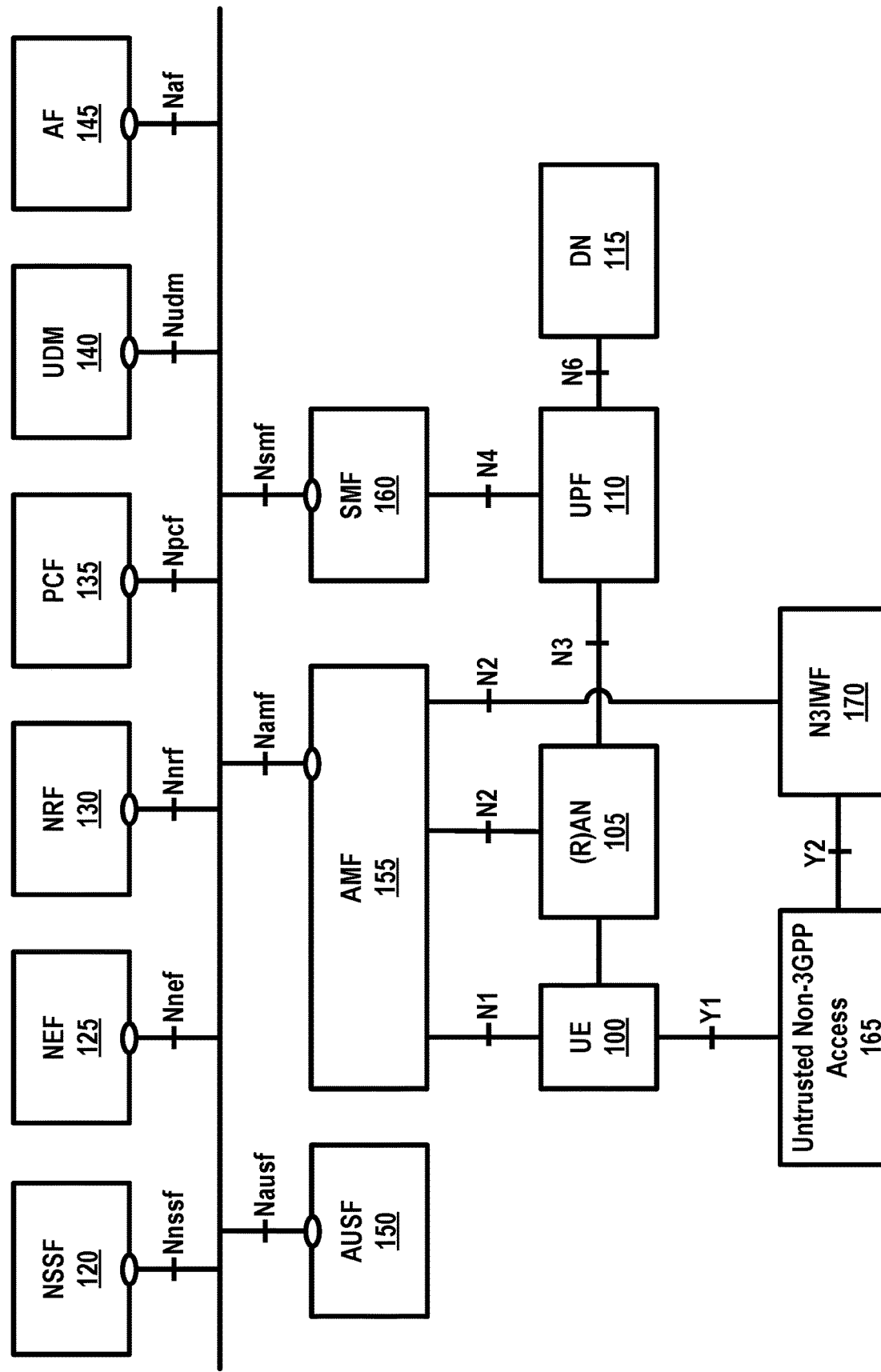
FIG. 1 is a diagram of an example 5G system architecture as per an aspect of an embodiment of the present disclosure.
Figure 2:
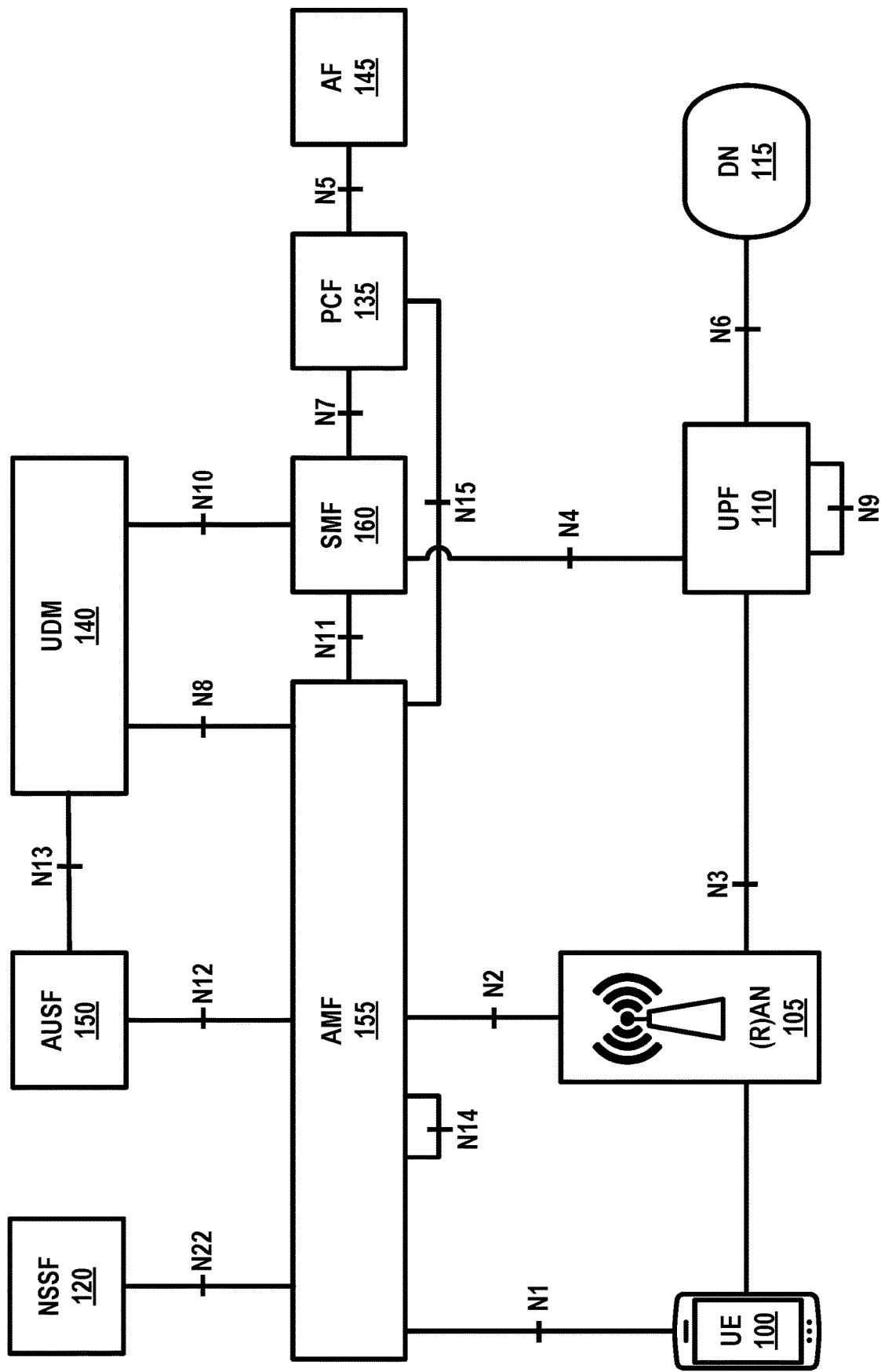
FIG. 2 is a diagram of an example 5G System architecture as per an aspect of an embodiment of the present disclosure.

The following acronyms are used throughout the present disclosure:

5G 5th generation mobile networks
5G-AN 5G Access Network
5GC 5G Core Network
5G-GUTI 5G Globally Unique Temporary Identifier
5GS 5G System
5G-S-TMSI 5G S-Temporary Mobile Subscription Identifier
5QI 5G QoS Indicator
AF Application Function
AMBR Aggregate Maximum Bit Rate
AMF Access and Mobility Management Function
AN Access Network
APN Access Point Name
ARP Allocation and Retention Priority
ATSSS Access Traffic Steering, Switching, Splitting
ATSSS-LL ATSSS Low-Layer
BD Billing Domain
CDR Charging Data Record
CHF Charging Function
CN Core Network
CP Control Plane
CSP Communication Service Provider
DDoS Distributed Denial of Service
DL Downlink
DN Data Network
DN-AAA Data Network Authentication Authorization and Accounting
DNN Data Network Name
eMBB enhanced Mobile Broadband
EPC Evolved Packet Core
EPS Evolved Packet System
FDD Frequency Division Duplex
FQDN Fully Qualified Domain Name
GFBR Guaranteed Flow Bit Rate
GPSI Generic Public Subscription Identifier
GW Gateway GUAMI Globally Unique AMF Identifier
HPCF Home PCF
HSMF Home SMF
HTTP Hypertext Transfer Protocol
ID Identifier
IMS IP Multimedia core network Subsystem
IMSI International Mobile Subscriber Identity
IoT Internet of Things
IP Internet Protocol
IP-CAN IP Connectivity Access Network
KPI Key Performance Indicator
L2 Layer 2 (data link layer)
L3 Layer 3 (network layer)
LADN Local Area Data Network
LAN local area network
MAC Media Access Control
MFBR Maximum Flow Bit Rate
MPTCP Multi-Path TCP Protocol
MA PDU Multiple Access Packet Data Unit
MICO Mobile Initiated Connection Only
MIoT Massive IoT
N3IWF Non-3GPP InterWorking Function
NAS Non Access Stratum
NAT Network address translation
NEF Network Exposure Function
NF Network Function
NR New Radio
NG-RAN NR Radio Access Network
NRF Network Repository Function
NSI Network Slice Instance
NSSAI Network Slice Selection Assistance Information
NSSF Network Slice Selection Function
NWDAF Network Data Analytics Function
OAM Operation Administration and Maintenance
PCC Policy and Charging Control
PCF Policy Control Function
PDN Packet Data Networks
PDU Packet Data Unit
PEI Permanent Equipment Identifier
PLMN Public Land Mobile Network
QCI QoS Class Identifier
QFI QoS Flow Identifier
QoS Quality of Service
RA Random Access
RAN Radio Access Network
RAT Radio Access Technology
RQA Reflective QoS Attribute
RRC Radio Resource Control
RM Registration Management
SBA Service Based Architecture
SM Session Management
SMF Session Management Function
SMSF SMS Function
S-NSSAI Single Network Slice Selection Assistance information
SS Synchronization Signal
SSC Session and Service Continuity
SUPI Subscriber Permanent Identifier
TA Tracking Area
TAI Tracking Area Identity
TCP Transmission Control Protocol
UAV Unmanned Aerial Vehicles
UAS Unmanned Aircraft Systems
UDR Unified Data Repository
UDM Unified Data Management
UDP User Datagram Protocol
UE User Equipment
UL Uplink
UL CL Uplink Classifier
UPF User Plane Function
URLLC Ultra-Reliable Low Latency Communication
URSP UE Route Selection Policy
VPCF Visited PCF
VSMF Visited SMF
XML Extensible Markup Language Example FIG. 1 and FIG. 2 depict a 5G system comprising of access networks and 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
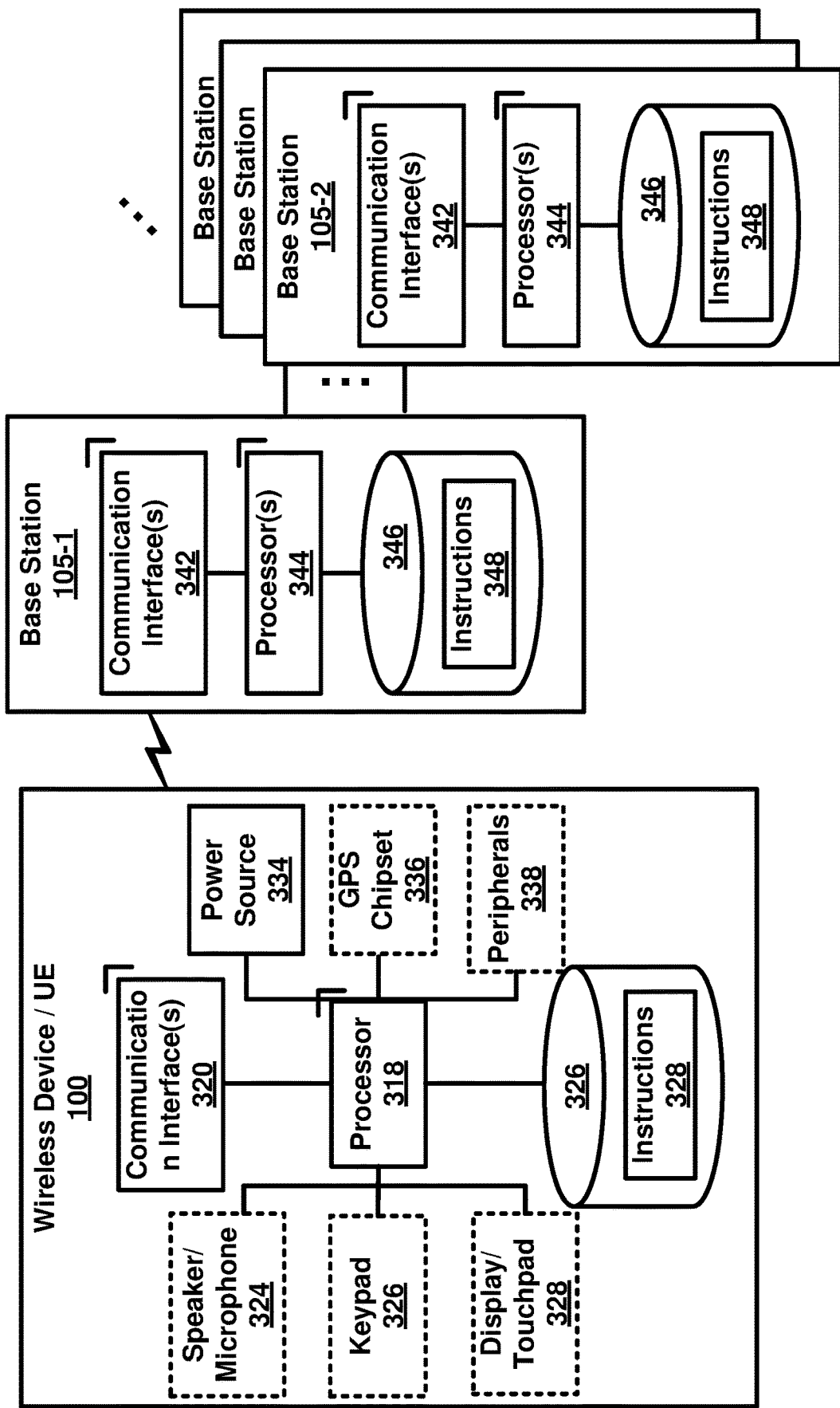
FIG. 3 is a system diagram of an example wireless device and a network node in a 5G system as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may comprise the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may comprise one or more of the following functionalities (one or more of the SMF 160 functionalities may be supported in a single instance of an SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115, and/or the like.

In an example, a user plane function, UPF 110, may comprise one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may comprise allocation and release of the UE 100 IP address and/or renewal of the allocated IP address. The UE 100 may set a requested PDU type during a PDU session establishment procedure based on its IP stack capabilities and/or configuration. In an example, the SMF 160 may select PDU type of a PDU session. In an example, if the SMF 160 receives a request with PDU type set to IP, the SMF 160 may select PDU type IPv4 or IPv6 based on DNN configuration and/or operator policies. In an example, the SMF 160 may provide a cause value to the UE 100 to indicate whether the other IP version is supported on the DNN. In an example, if the SMF 160 receives a request for PDU type IPv4 or IPv6 and the requested IP version is supported by the DNN the SMF 160 may select the requested PDU type.

In an example embodiment, the 5GC elements and UE 100 may support the following mechanisms: during a PDU session establishment procedure, the SMF 160 may send the IP address to the UE 100 via SM NAS signaling. The IPv4 address allocation and/or IPv4 parameter configuration via DHCPv4 may be employed once PDU session may be established. IPv6 prefix allocation may be supported via IPv6 stateless autoconfiguration, if IPv6 is supported. In an example, 5GC network elements may support IPv6 parameter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of PDU sessions. A UPF 110 that provides the interface to a data network may support functionality of a PDU session anchor.

In an example, a policy control function, PCF 135, may support unified policy framework to govern network behavior, provide policy rules to control plane function(s) to enforce policy rules, implement a front end to access subscription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, a network repository function, NRF 130 may support service discovery function that may receive NF discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155(s) 155 by querying the NRF 130.

In an example, stored data in a UDR may comprise at least user subscription data, including at least subscription identifiers, security credentials, access and mobility related subscription data, session related subscription data, policy data, and/or the like.

In an example, an AUSF 150 may support authentication server function (AUSF 150).

In an example, an application function, AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the AN 105 for a PDU session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

Figure 5A:
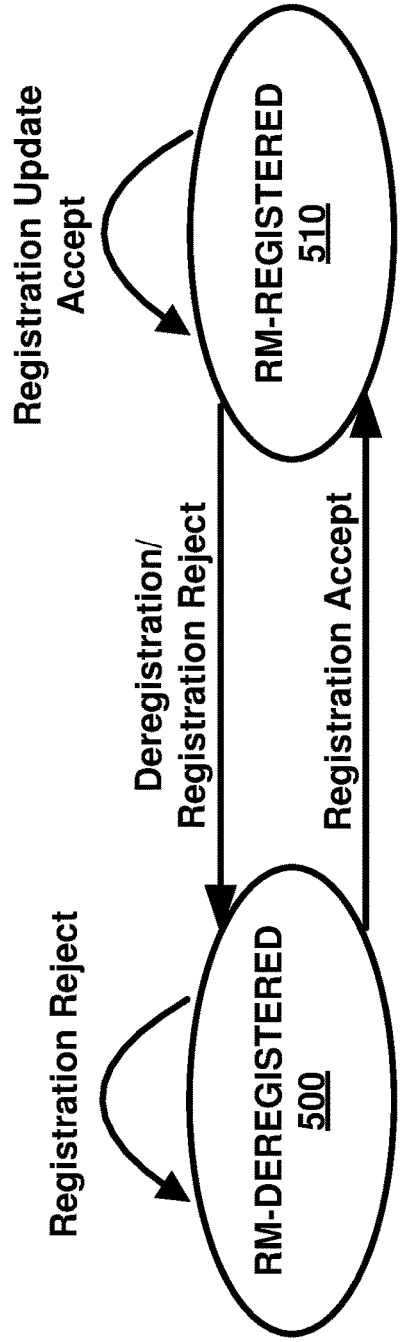
FIG. 5A and FIG. 5B depict two registration management state models in UE 100 and AMF 155 as per an aspect of embodiments of the present disclosure.
Figure 5B:
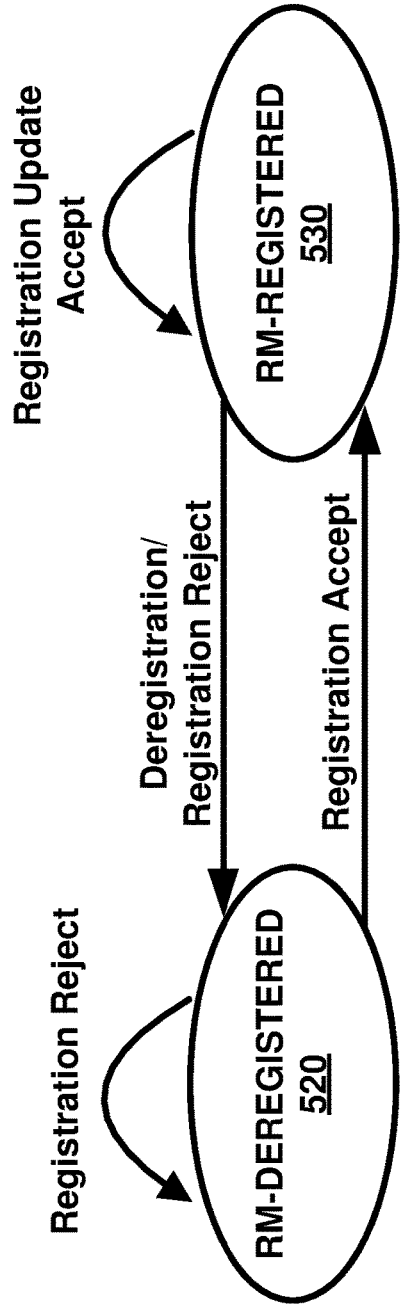

In an example, as depicted in example FIG. 5A and FIG. 5B, the registration management, RM may be employed to register or de-register a UE/user 100 with the network, and establish the user context in the network. Connection management may be employed to establish and release the signaling connection between the UE 100 and the AMF 155.

In an example, a UE 100 may register with the network to receive services that require registration. In an example, the UE 100 may update its registration with the network periodically in order to remain reachable (periodic registration update), or upon mobility (e.g., mobility registration update), or to update its capabilities or to re-negotiate protocol parameters.

Figure 8:
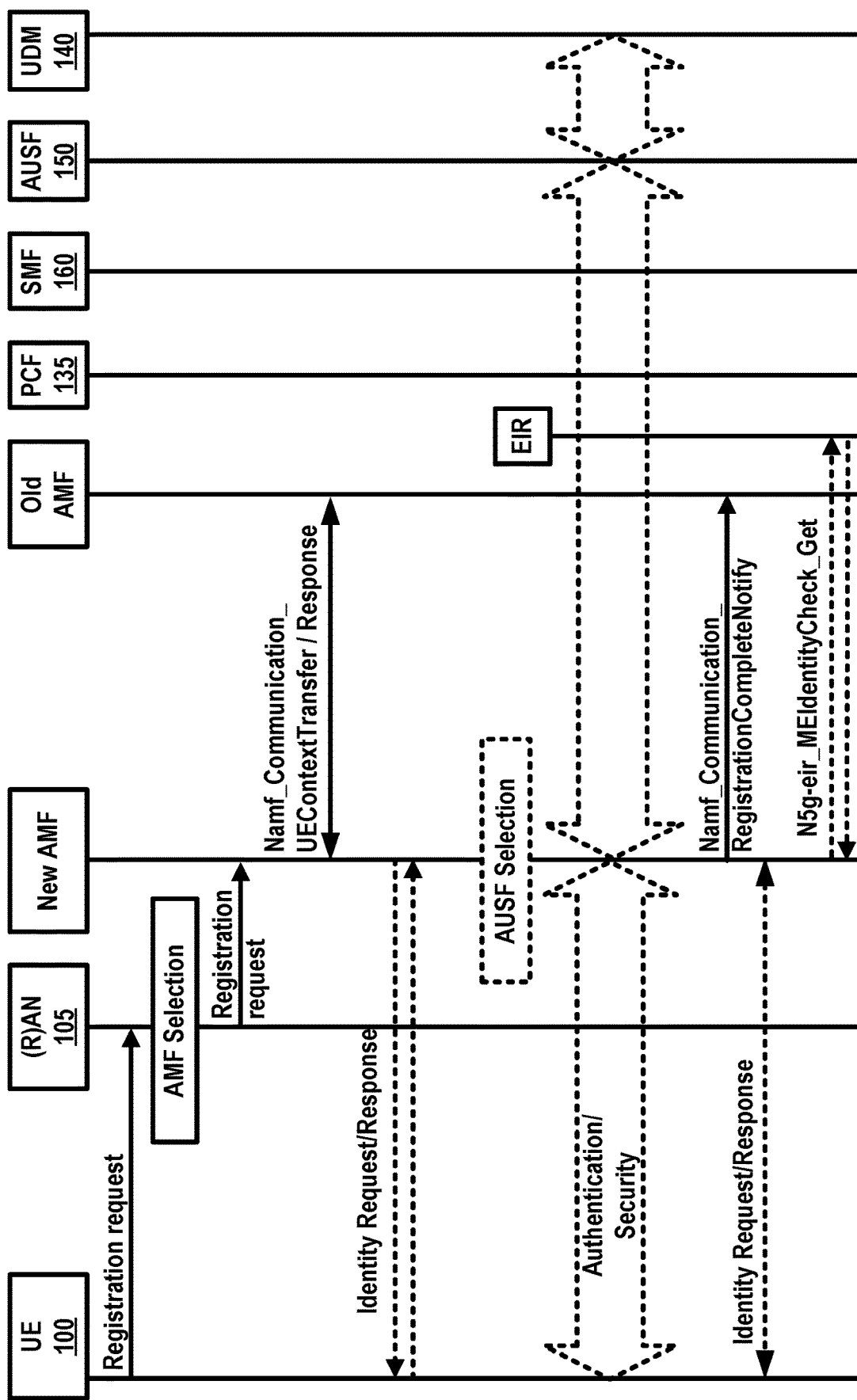
FIG. 8 and FIG. 9 is an example call flow for registration procedure as per an aspect of an embodiment of the present disclosure.
Figure 9:
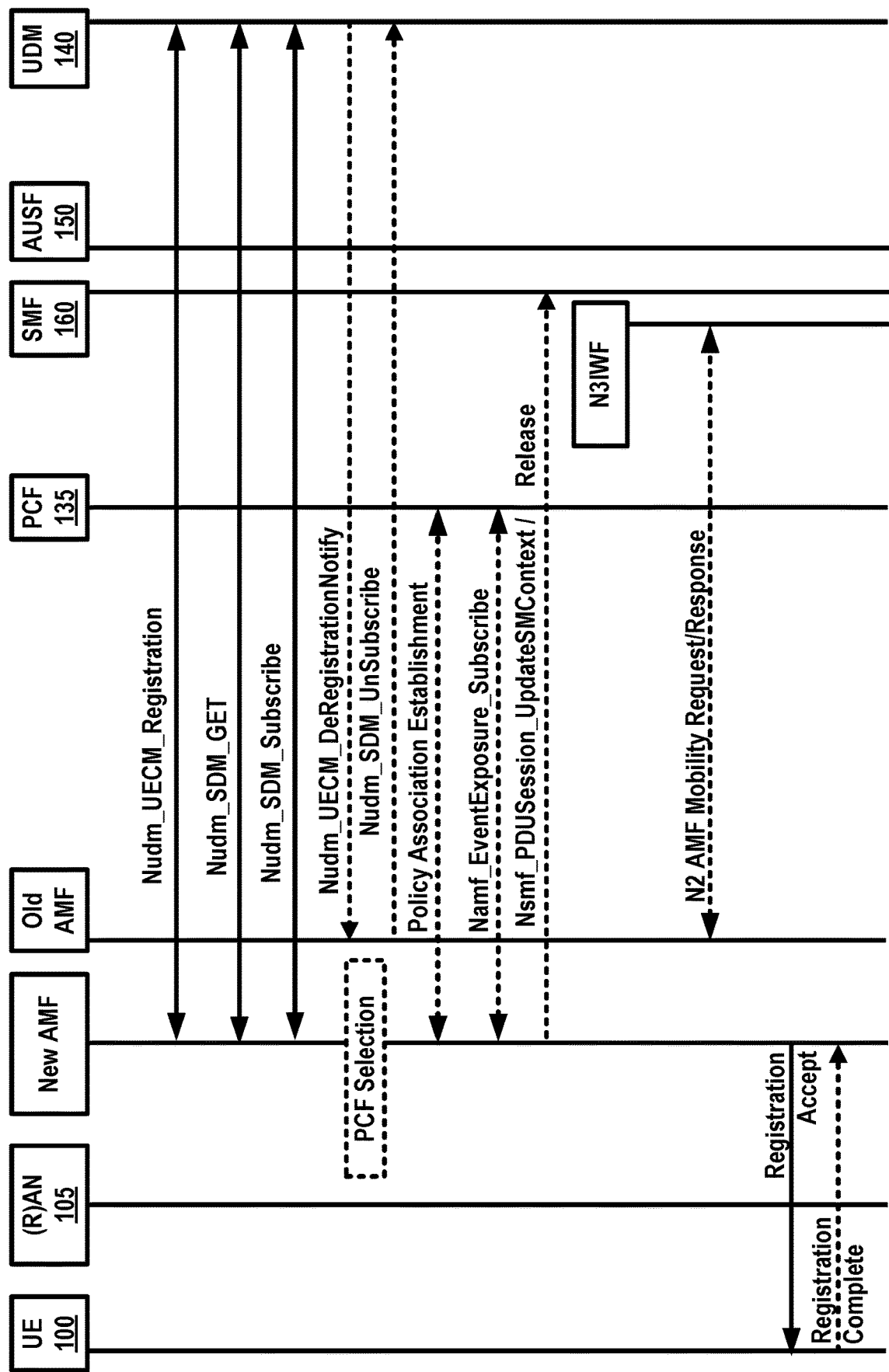

In an example, an initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM procedures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be registered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the AN signaling connection between the UE 100 and the (R)AN 105 (e.g. RRC connection over 3GPP access) and the N2 connection for the UE 100 between the AN and the AMF 155.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 may perform cell selection, cell reselection, PLMN selection, and/or the like. A UE 100 in CM-CONNECTED 610 state may have a NAS signaling connection with the AMF 155 over N1.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN 105 paging, to notify the network that it has left the RAN 105 notification area, and/or the like.

In an example, a NAS signaling connection management may comprise establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may comprise both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via PDU sessions that are established upon request from the UE 100.

In an example, a PDU session may support one or more PDU session types. PDU sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server, the 5GC may be able to trigger a specific application in the UE 100. When receiving the trigger, the UE 100 may send it to the identified application in the UE 100. The identified application in the UE 100 may establish a PDU session to a specific DNN.

Figure 7:
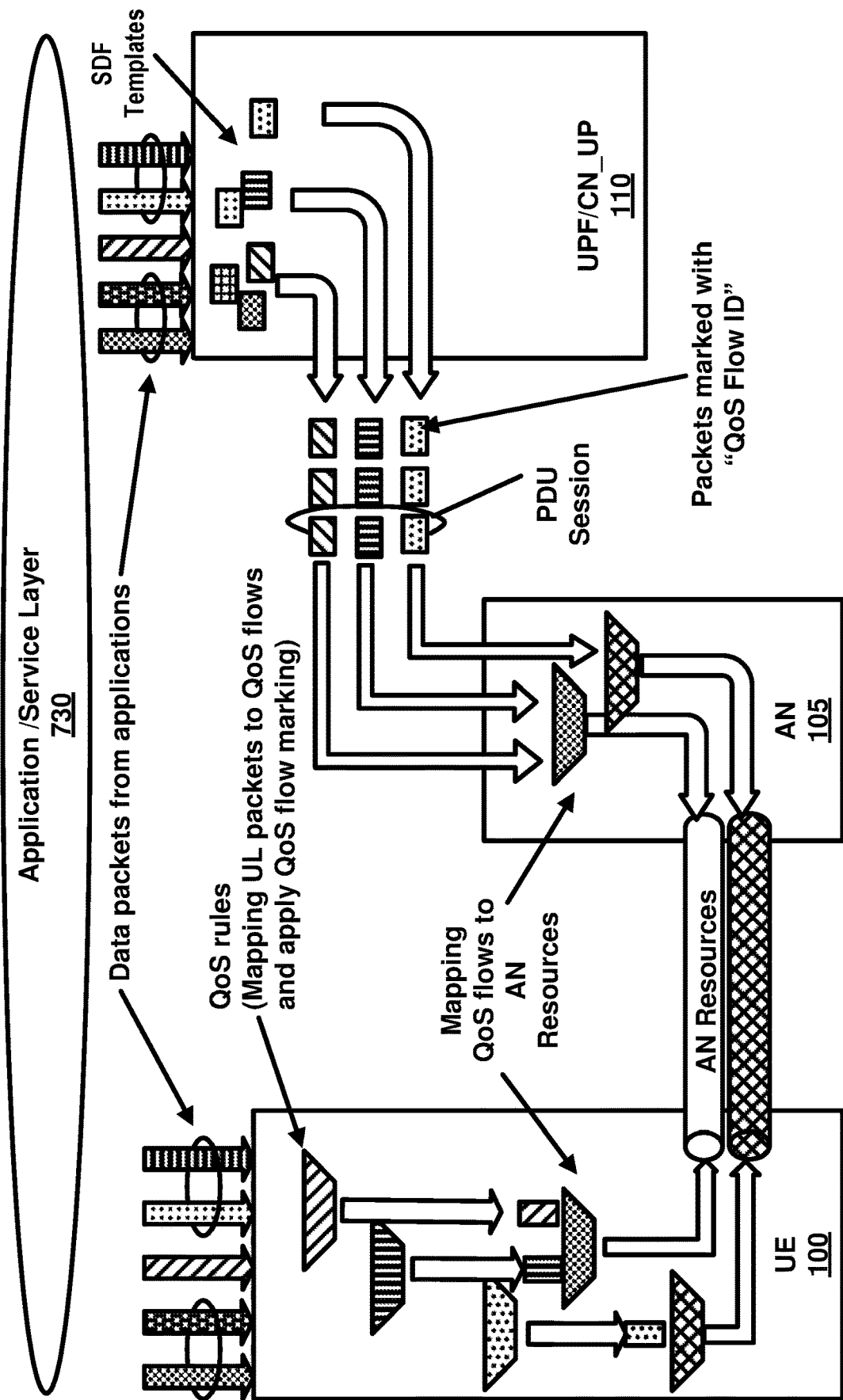
FIG. 7 is diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QoS differentiation in a PDU session. A QoS flow ID, QFI, may be employed to identify the QoS flow in the 5G system. In an example, user plane traffic with the same QFI within a PDU session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a PDU session.

In an example, the QoS parameters of a QoS flow may be provided to the (R)AN 105 as a QoS profile over N2 at PDU session establishment, QoS flow establishment, or when NG-RAN is used at every time the user plane is activated. In an example, a default QoS rule may be required for every PDU session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QoS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like.).

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may comprise local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEF 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A PDU session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices, and establishing one or more PDU session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service based interface may represent how a set of services may be provided/exposed by a given NF.

In an example, a service continuity may be an uninterrupted user experience of a service, including the cases where the IP address and/or anchoring point may change. In an example, a session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN—CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services. This representation may also comprise point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3IWF functions to the non-3GPP Access Network, and/or the like. Network slices may differ for supported features and network function implementation. The operator may deploy multiple network slice instances delivering the same features but for different groups of UEs, e.g. as they deliver a different committed service and/or because they may be dedicated to a customer. The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g. k=8, 16, etc) at a time. An AMF 155 instance serving the UE 100 logically may belong to a network slice instance serving the UE 100.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may comprise the S-NSSAI(s) of the network slices that the UE 100 subscribes to. One or more S-NSSAIs may be marked as default S-NSSAI. In an example, k S-NSSAI may be marked default S-NSSAI (e.g. k=8, 16, etc.). In an example, the UE 100 may subscribe to more than 8 S-NSSAIs.

In an example, a UE 100 may be configured by the HPLMN with a configured NSSAI per PLMN. Upon successful completion of a UE's registration procedure, the UE 100 may obtain from the AMF 155 an Allowed NSSAI for this PLMN, which may comprise one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more PDU sessions to the required data network via the network slice instance(s), and/or the like.

In an example, when a UE 100 registers with a PLMN, if the UE 100 for the PLMN has a configured NSSAI or an allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 should be served by a different AMF 155 based on network slice(s) aspects, the AMF 155 that first received the registration request may redirect the registration request to another AMF 155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more PDU sessions established corresponding to the a specific S-NSSAI, the UE 100 may route the user data of the application in one of the PDU sessions, unless other conditions in the UE 100 may prohibit the use of the PDU sessions. If the application provides a DNN, then the UE 100 may consider the DNN to determine which PDU session to use. In an example, if the UE 100 does not have a PDU session established with the specific S-NSSAI, the UE 100 may request a new PDU session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a PDU session. The selected SMF 160 may establish the PDU session based on S-NSSAI and DNN.

In an example, in order to support network-controlled privacy of slice information for the slices the UE 100 may access, when the UE 100 is aware or configured that privacy considerations may apply to NSSAI, the UE 100 may not comprise NSSAI in NAS signaling unless the UE 100 has a NAS security context and the UE 100 may not comprise NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by each PLMN based on the provided S-NSSAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an AN message (comprising AN parameters, RM-NAS registration request (registration type, SUCI or SUPI or 5G-GUTI, last visited TAI (if available), security parameters, requested NSSAI, mapping of requested NSSAI, UE 100 5GC capability, PDU session status, PDU session(s) to be re-activated, Follow on request, MICO mode preference, and/or the like), and/or the like). In an example, in case of NG-RAN, the AN parameters may comprise e.g. SUCI or SUPI or the 5G-GUTI, the Selected PLMN ID and requested NSSAI, and/or the like. In an example, the AN parameters may comprise establishment cause. The establishment cause may provide the reason for requesting the establishment of an RRC connection. In an example, the registration type may indicate if the UE 100 wants to perform an initial registration (i.e. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performing an initial registration (i.e., the UE 100 is in RM-DEREGISTERED state) to a PLMN for which the UE 100 does not already have a 5G-GUTI, the UE 100 may comprise its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may comprise the SUPI in the registration request message. For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (i.e. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may comprise the mapping of requested NSSAI, which may be the mapping of each S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection. requested NSSAI may indicate the network slice selection assistance information. The PDU session status may indicates the previously established PDU sessions in the UE. When the UE 100 is connected to the two AMF 155 belonging to different PLMN via 3GPP access and non-3GPP access then the PDU session status may indicate the established PDU session of the current PLMN in the UE. The PDU session(s) to be re-activated may be included to indicate the PDU session(s) for which the UE 100 may intend to activate UP connections. A PDU session corresponding to a LADN may not be included in the PDU session(s) to be re-activated when the UE 100 is outside the area of availability of the LADN. The follow on request may be included when the UE 100 may have pending uplink signaling and the UE 100 may not comprise PDU session(s) to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection.

In an example, the (R)AN 105 may send to the new AMF 155 an N2 message (comprising: N2 parameters, RM-NAS registration request (registration type, SUPI or 5G-GUTI, last visited TAI (if available), security parameters, requested NSSAI, mapping of requested NSSAI, UE 100 5GC capability, PDU session status, PDU session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may comprise the establishment cause.

In an example, the new AMF 155 may send to the old AMF 155 an Namf_Communication_UEContextTransfer (complete registration request). In an example, if the UE's 5G-GUTI was included in the registration request and the serving AMF 155 has changed since last registration procedure, the new AMF 155 may invoke the Namf_Communication_UEContextTransfer service operation on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by each NF consumer, for the UE, to the new AMF 155. In an example, if the UE 100 identifies itself with PEI, the SUPI request may be skipped.

In an example, the old AMF 155 may send to new AMF 155 a response to Namf_Communication_UEContextTransfer (SUPI, MM context, SMF 160 information, PCF ID). In an example, the old AMF 155 may respond to the new AMF 155 for the Namf_Communication_UEContextTransfer invocation by including the UE's SUPI and MM context. In an example, if old AMF 155 holds information about established PDU sessions, the old AMF 155 may comprise SMF 160 information including S-NSSAI(s), SMF 160 identities and PDU session ID. In an example, if old AMF 155 holds information about active NGAP UE-TNLA bindings to N3IWF, the old AMF 155 may comprise information about the NGAP UE-TNLA bindings.

In an example, if the SUPI is not provided by the UE 100 nor retrieved from the old AMF 155 the identity request procedure may be initiated by the AMF 155 sending an identity request message to the UE 100 requesting the SUCI.

In an example, the UE 100 may respond with an identity response message including the SUCI. The UE 100 may derive the SUCI by using the provisioned public key of the HPLMN.

In an example, the AMF 155 may decide to initiate UE 100 authentication by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration, the AMF 155 may skip the authentication and security setup, or the AMF 155 may accept that the authentication may fail and may continue the registration procedure.

In an example, the authentication may be performed by Nudm_UEAuthenticate_Get operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Namf_Communication_RegistrationCompleteNotify. If the AMF 155 has changed, the new AMF 155 may notify the old AMF 155 that the registration of the UE 100 in the new AMF 155 may be completed by invoking the Namf_Communication_RegistrationCompleteNotify service operation. If the authentication/security procedure fails, then the registration may be rejected, and the new AMF 155 may invoke the Namf_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which PDU session may not be supported in the new registration area. The new AMF 155 may invoke the Namf_Communication_RegistrationCompleteNotify service operation including the rejected PDU session ID and a reject cause (e.g. the S-NSSAI becomes no longer available) towards the old AMF 155. The new AMF 155 may modify the PDU session status correspondingly. The old AMF 155 may inform the corresponding SMF 160(s) to locally release the UE's SM context by invoking the Nsmf_PDUSession_ReleaseSMContext service operation.

In an example, the new AMF 155 may send to the UE 100 an identity request/response (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check by invoking the N5g-eir_EquipmentIdentityCheck_Get service operation.

In an example, the new AMF 155, based on the SUPI, may select a UDM 140. The UDM 140 may select a UDR instance. In an example, the AMF 155 may select a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM_Registration and may subscribe to be notified when the UDM 140 may deregister the AMF 155. The UDM 140 may store the AMF 155 identity associated to the access type and may not remove the AMF 155 identity associated to the other access type. The UDM 140 may store information provided at registration in UDR, by Nudr_UDM_Update. In an example, the AMF 155 may retrieve the access and mobility subscription data and SMF 160 selection subscription data using Nudm_SDM_Get. The UDM 140 may retrieve this information from UDR by Nudr_UDM_Query (access and mobility subscription data). After a successful response is received, the AMF 155 may subscribe to be notified using Nudm_SDM_Subscribe when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160s of the UE 100 to notify that the UE 100 is deregistered from old AMF 155. The SMF 160 may release the PDU session(s) on getting this notification. In an example, the old AMF 155 may unsubscribe with the UDM 140 for subscription data using Nudm_SDM_unsubscribe.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select a PCF 135. If the new AMF 155 receives a PCF ID from the old AMF 155 and successfully contacts the PCF 135 identified by the PCF ID, the AMF 155 may select the (V-)PCF identified by the PCF ID. If the PCF 135 identified by the PCF ID may not be used (e.g. no response from the PCF 135) or if there is no PCF ID received from the old AMF 155, the AMF 155 may select a PCF 135.

In an example, the new AMF 155 may perform a policy association establishment during registration procedure. If the new AMF 155 contacts the PCF 135 identified by the (V-) PCF ID received during inter-AMF 155 mobility, the new AMF 155 may comprise the PCF-ID in the Npcf_AM-PolicyControl Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_Event-Exposure_Subscribe service operation for UE 100 event subscription.

In an example, the AMF 155 may send to the SMF 160 an Nsmf_PDUSession_UpdateSMContext. In an example, the AMF 155 may invoke the Nsmf_PDUSession_UpdateSMContext if the PDU session(s) to be re-activated is included in the registration request. The AMF 155 may send Nsmf_PDUSession_UpdateSMContext request to SMF 160(*s*) associated with the PDU session(s) to activate user plane connections of the PDU session(s). The SMF 160 may decide to trigger e.g. the intermediate UPF 110 insertion, removal or change of PSA. In the case that the intermediate UPF 110 insertion, removal, or relocation is performed for the PDU session(s) not included in PDU session(s) to be re-activated, the procedure may be performed without N11 and N2 interactions to update the N3 user plane between (R)AN 105 and 5GC. The AMF 155 may invoke the Nsmf_PDUSession_ReleaseSMContext service operation towards the SMF 160 if any PDU session status indicates that it is released at the UE 100. The AMF 155 may invoke the Nsmf_PDUSession_ReleaseSMContext service operation towards the SMF 160 in order to release any network resources related to the PDU session.

In an example, the new AMF 155 may send to a N3IWF an N2 AMF 155 mobility request. If the AMF 155 has changed, the new AMF 155 may create an NGAP UE 100 association towards the N3IWF to which the UE 100 is connected. In an example, the N3IWF may respond to the new AMF 155 with an N2 AMF 155 mobility response.

In an example, the new AMF 155 may send to the UE 100 a registration accept (comprising: 5G-GUTI, registration area, mobility restrictions, PDU session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established PDU sessions to the UE 100 in the PDU session status. The UE 100 may remove locally any internal resources related to PDU sessions that are not marked as established in the received PDU session status. In an example, when the UE 100 is connected to the two AMF 155 belonging to different PLMN via 3GPP access and non-3GPP access then the UE 100 may remove locally any internal resources related to the PDU session of the current PLMN that are not marked as established in received PDU session status. If the PDU session status information was in the registration request, the AMF 155 may indicate the PDU session status to the UE. The mapping of allowed NSSAI may be the mapping of each S-NSSAI of the allowed NSSAI to the S-NSSAIs of the configured NSSAI for the HPLMN. The AMF 155 may comprise in the registration accept message the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request PDU session for emergency services. In an example, the handover restriction list and UE-AMBR may be provided to NG-RAN by the AMF 155.

In an example, the UE 100 may send to the new AMF 155 a registration complete message. In an example, the UE 100 may send the registration complete message to the AMF 155 to acknowledge that a new 5G-GUTI may be assigned. In an example, when information about the PDU session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
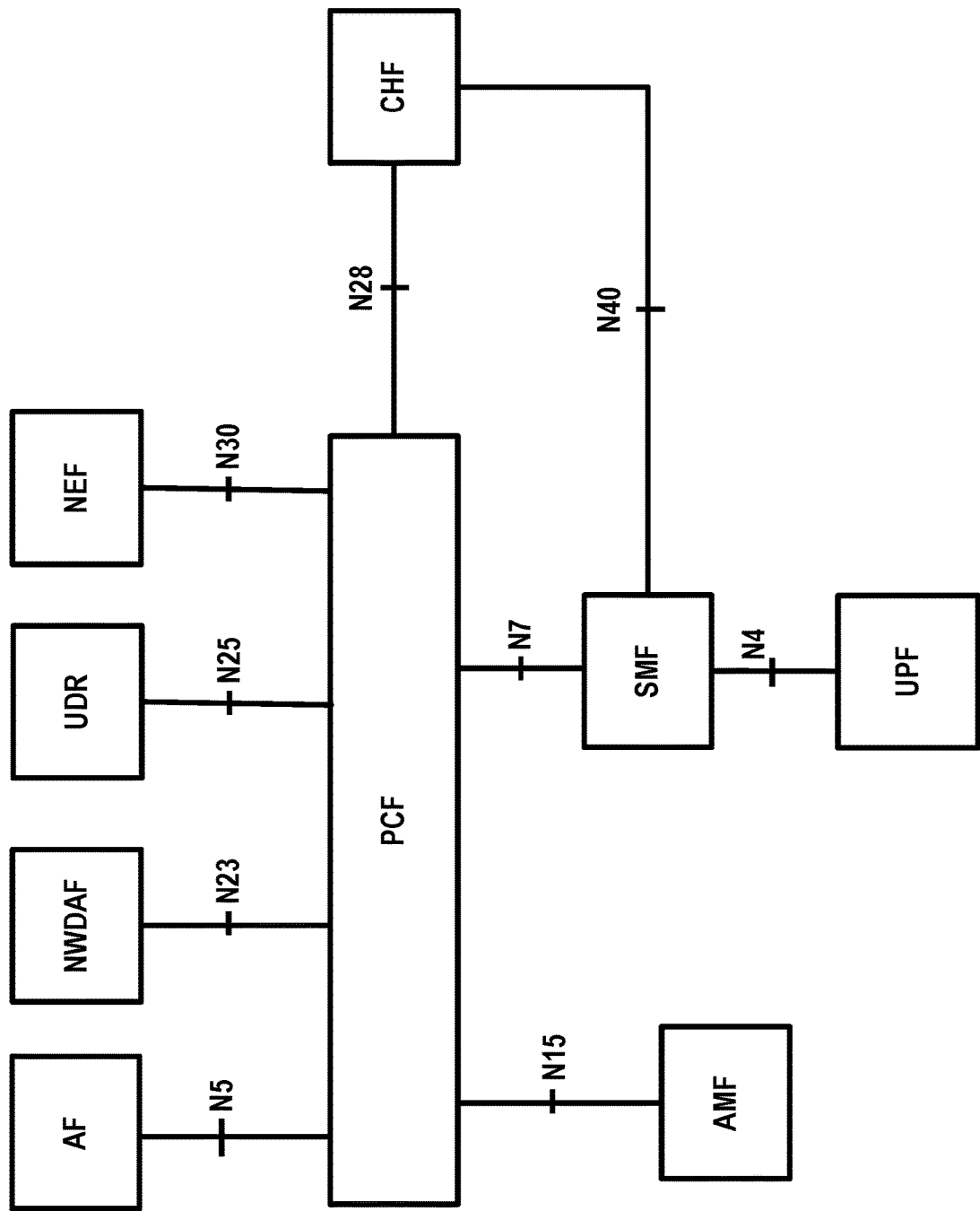
FIG. 10 is a diagram of an example 5G policy and charging control system architecture as per an aspect of an embodiment of the present disclosure.

FIG. 10 is an example diagram of 5G policy and charging control system architecture. The reference architecture of policy and charging control framework for the 5G system may comprise one or more of the following network functions: policy control function (PCF), session management function (SMF), user plane function (UPF), access and mobility management function (AMF), network exposure functionality (NEF), network data analytics function (NWDAF), charging function (CHF), application function (AF) and unified data repository (UDR).

In an example, the CHF may support at least one charging method: offline charging, online charging, or converged charging.

In an example, the offline charging may be a process where charging information for network resource usage may be collected concurrently with that resource usage. At the end of the process, CDR files may be generated by the network, which may be transferred to a network operator's billing domain (BD) for the purpose of subscriber billing and/or inter-operator accounting (or additional functions, e.g. statistics, at the operator's discretion). The BD typically comprises post-processing systems such as the operator's billing system or billing mediation device. In an example conclusion, offline charging may be a mechanism where charging information does not affect, in real-time, the service rendered.

In an example, online charging may be a process where charging information for network resource usage may be collected concurrently with that resource usage in the same fashion as in offline charging. Authorization for the network resource usage may be obtained by the network prior to the actual resource usage to occur. In an example, the charging information utilized in online charging may be not necessarily identical to the charging information employed in offline charging. In an example conclusion, online charging may be a mechanism where charging information may affect, in real-time, the service rendered and therefore a direct interaction of the charging mechanism with the control of network resource usage may be required.

In an example, converged charging may be a process where online and offline charging may be combined.

Figure 11:
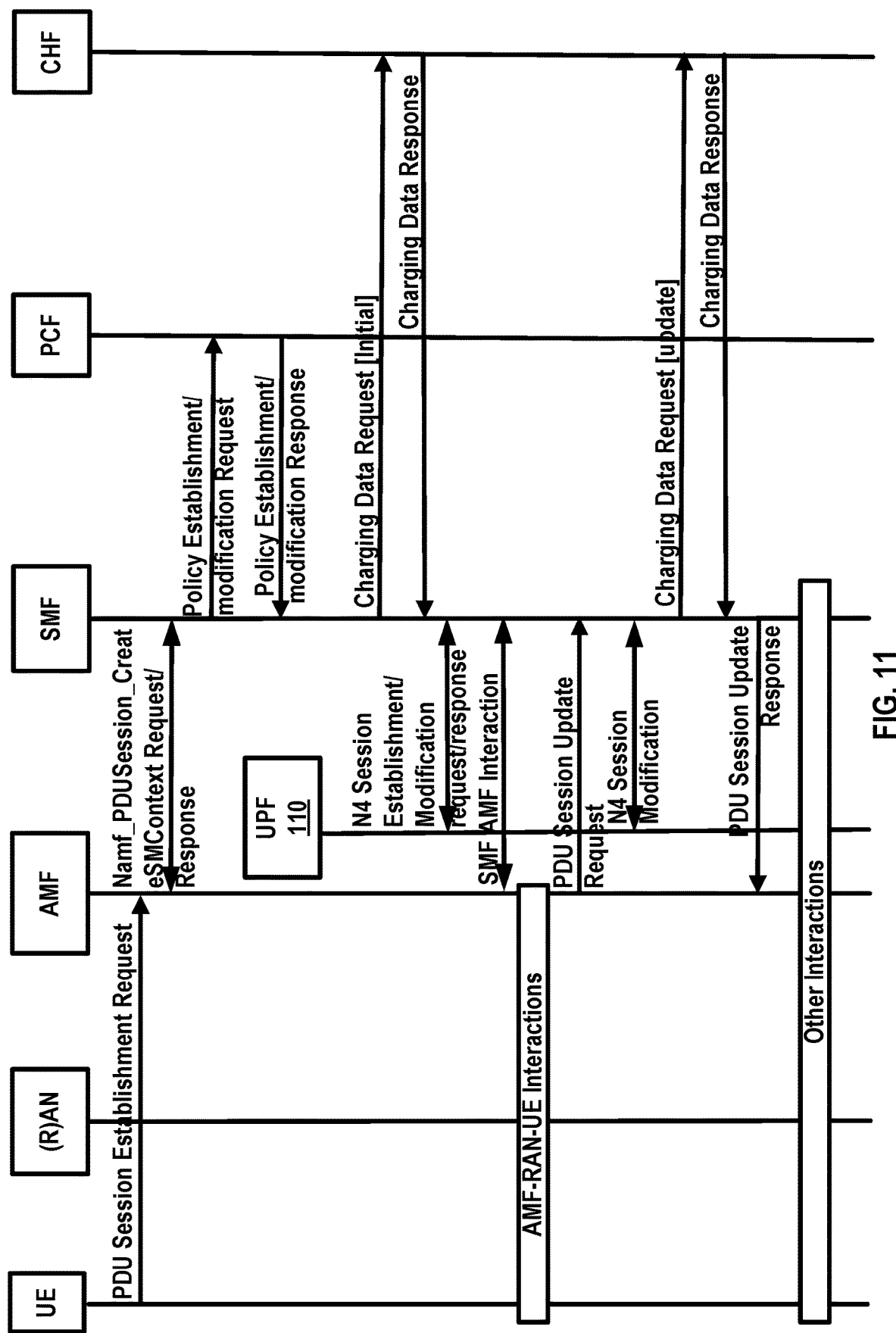
FIG. 11 is an example call flow for PDU session establishment procedure as per an aspect of an embodiment of the present disclosure.

FIG. 11 is an example call flow for PDU session establishment (charging) as per an aspect of an embodiment of the present disclosure. In an example, a UE may initiate a PDU Session establishment procedure by sending a PDU Session Establishment Request message to an AMF. The PDU Session Establishment Request message may comprise one or more of: PDU session ID, PDU Type, SSC mode, User location information, and Access Technology Type Information.

In response to the message received from the UE, an AMF may select an SMF and send to the selected SMF a message (e.g. Namf_PDUSession_CreateSMContext Request). The message sent to the SMF may be used by the AMF to request establishing the PDU session. In response to receiving the message from the AMF, the SMF may send a response message (e.g. Namf_PDUSession_CreateSMContext Response) to the AMF to indicate whether the request from the AMF is accepted or not.

In an example, the SMF may select a PCF and send to the PCF a message (e.g. SM Policy Association Establishment Request) to request PCC rules. The PCF may provide PCC rules in a response message (e.g. SM Policy Association Establishment response) to the SMF.

In an example, the SMF may create a Charging Id for the PDU session and may send a Charging Data Request [initial] message to a CHF to verify authorization of a subscriber of the UE to start the PDU session which is triggered by start of PDU session charging event.

In an example, the CHF may open a charging data record (CDR) for the PDU session and may acknowledge the Charging Data Request message by sending Charging Data Response to the SMF.

In an example, the SMF selects a UPF and may initiate an N4 Session Establishment/Modification procedure with the selected UPF.

The SMF may interact with the AMF. For example, the SMF may send to the AMF a Namf_Communication_N1N2MessageTransfer message comprising one or more of: PDU session ID, QoS Profile(s), CN Tunnel Info, and S-NSSAI from the Allowed NSSAI. This SMF/AMF interaction is labeled in FIG. 11 as SMF AMF Interaction.

In an example, the AMF may interact with the (R)AN and the UE. This interaction is labeled in FIG. 11 as AMF-RAN-UE Interactions. As part of the AMF-RAN-UE Interactions, the AMF may interact with the (R)AN and the UE by sending to the (R)AN a N2 PDU Session Request message comprising the information received from the SMF that indicates the PDU session establishment is accepted.

In an example, and as further part of the AMF-RAN-UE Interactions, the (R)AN may send to the AMF a N2 PDU Session Response message comprising one or more of: PDU session ID, N2 SM information (PDU session ID, AN Tunnel Info, List of accepted/rejected QFI(s)), wherein the AN Tunnel Info may correspond to the Access Network address of the N3 tunnel corresponding to the PDU Session.

In an example, the AMF may send to the SMF a PDU Session Update Request message (e.g. Nsmf_PDUSession_UpdateSMContext Request message) comprising the N2 SM information received from the (R)AN to the SMF.

In an example, the SMF may initiate an N4 Session Modification procedure with the UPF. As part of the N4 Session Modification procedure, the SMF may provide AN Tunnel Info to the UPF as well as the corresponding forwarding rules, and the UPF may send to the SMF a response message.

In an example, the SMF may request quota from CHF, e.g. "start of service data flow" event may need quota from CHF. The SMF may send a message to the CHF (e.g. Charging Data Request [update]). In an example, for online charging or converged charging, the SMF may request quota from CHF when allocated quota is consumed or a trigger is met to request a quota.

In an example, the UPF may report resource usage of a PDU session to the SMF. In an example, the UPF may report resource usage of a wireless device to the SMF. by enforcing the charging control rules, the SMF may send to the CHF a message (e.g. Charging Data Request [update]) comprising resource usage information received from the UPF.

In an example, the CHF may update CDR for this PDU session. The CHF may acknowledge the SMF by sending a Charging Data Response message.

In an example, the SMF may send to the AMF a Nsmf_PDUSession_UpdateSMContext Response message.

In an example, other interactions may be performed between SMF, AMF, (R)AN and UE for the PDU session establishment procedure, this interaction is labeled in FIG. 11 as Other Interactions.

In an example, 5GC may be able to provide policy information from a PCF to a UE, and such policy information may comprise Access Network Discovery & Selection Policy (ANDSP) and/or UE Route Selection Policy (URSP).

In an example, the ANDSP is used by the UE for selecting non-3GPP accesses and for selection of the N3IWF in a PLMN. In an example, the URSP is used by the UE to determine if a detected application may be associated to an established PDU Session, may be offloaded to non-3GPP access outside a PDU Session, or may trigger the establishment of a new PDU Session. In an example, the URSP rules may comprise traffic descriptors that specify the matching criteria and one or more of the following components: SSC Mode Selection Policy (SSCMSP), Network Slice Selection Policy (NSSP), DNN Selection Policy, PDU Session Type Policy, Non-seamless Offload Policy, and/or Access Type preference. In an example, the SSCMSP is used by the UE to associate the matching application with SSC modes. In an example, the NSSP is used by the UE to associate the matching application with S-NSSAI. In an example, the DNN Selection Policy is used by the UE to associate the matching application with DNN. In an example, the PDU Session Type Policy is used by the UE to associate the matching application with a PDU Session Type. In an example, the Non-seamless Offload Policy is used by the UE to determine that the matching application should be non-seamlessly offloaded to non-3GPP access (i.e. outside of a PDU Session). In an example, the Access Type preference may indicate the preferred Access Type (3GPP or non-3GPP) If the UE needs to establish a PDU Session for the matching application, this. In an example, the ANDSP and URSP may be pre-configured in the UE or may be provisioned to UE from PCF. The pre-configured policy may be applied by the UE when it has not received the same type of policy from PCF. In an example, the PCF may select the ANDSP and URSP applicable for a UE based on local configuration, Subscribed S-NSSAIs and operator policies taking into consideration e.g. accumulated usage, load level information per network slice instance, UE location. In an example, in the case of a roaming UE, the V-PCF may retrieve ANDSP and URSP from the H-PCF over N24/Npcf. When the UE is roaming and the UE has valid rules from both HPLMN and VPLMN the UE may give priority to the valid ANDSP rules from the VPLMN.

In an example, the ANDSP and URSP may be provided from the PCF to an AMF via N15/Namf interface and then from AMF to the UE via the N1 interface. The AMF may not change the ANDSP and the URSP provided by PCF.

In an example, the PCF may be responsible for delivery of UE policy. If the PCF is notified UE Policy delivery failure (e.g. because of UE unreachable), the PCF may subscribe the "Connectivity state changes (IDLE or CONNECTED)" event. After reception of the Notify message indicating that the UE enters the CM-Connected state, the PCF may retry to deliver the UE Policy.

A Network Slice may comprise at least one of the following: the Core Network Control Plane and user plane Network Functions; the 5G Radio Access Network; and/or the N3IWF functions to the non-3GPP Access Network. Network slices may differ for supported features and network functions implementation. The operator may deploy multiple Network Slice instances delivering the same features but for different groups of UEs, e.g. as they deliver a different committed service and/or because they may be dedicated to a customer. The NSSF may store the mapping information between slice instance ID and NF ID (or NF address).

A single UE may simultaneously be served by one or more network slice instances via a 5G-AN. In an example, a single UE may be served by k network slices (e.g. k=8, 16, etc.) at a time. An AMF instance serving the UE logically belongs to a Network Slice instances serving the UE.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a Network Slice. An S-NSSAI may be comprised of: a slice/service type (SST), which may refer to the expected Network Slice behavior in terms of features and services; and/or a slice differentiator (SD). A slice differentiator may be optional information that complements the slice/service type(s) to allow further differentiation for selecting an network slice instance from potentially multiple network slice instances that comply with the indicated slice/service type. This information may be referred to as SD. The same Network Slice instance may be selected employing different S-NSSAIs. The CN part of a Network Slice instance(s) serving a UE may be selected by CN.

Subscription data may comprise the S-NSSAI(s) of the Network Slices that the UE subscribes to. One or more S-NSSAIs may be marked as default S-NSSAI. In an example, k S-NSSAI may be marked Default S-NSSAI (e.g. k=8, 16, etc). In an example, the UE may subscribe to more than 8 S-NSSAI.

A UE may be configured by the HPLMN with a Configured NSSAI per PLMN. Upon successful completion of a UE's Registration procedure, the UE may obtain from the AMF an Allowed NSSAI for this PLMN, which may comprise one or more S-NSSAIs.

The Allowed NSSAI may take precedence over the Configured NSSAI for this PLMN. The UE may use the S-NS-SAIs in the Allowed NSSAI corresponding to a Network Slice for the subsequent Network Slice selection related procedures in the serving PLMN.

The establishment of user plane connectivity to a data network via a network slice instance(s) may comprise one or more of the following steps: performing a RM procedure to select an AMF that supports the required Network Slices; establishing one or more PDU session to the required Data network via the Network Slice Instance(s).

When a UE registers with a PLMN, if the UE for this PLMN has a configured NSSAI or an allowed NSSAI, the UE may provide to the network in RRC and NAS layer a Requested NSSAI containing the S-NSSAI(s) corresponding to the slice(s) to which the UE attempts to register, in addition to the temporary user ID if one was assigned to the UE. The Requested NSSAI may be either: the Configured-NSSAI; the Allowed-NSSAI.

In an example, when a UE registers with a PLMN, if for this PLMN the UE has no Configured NSSAI or Allowed NSSAI, the RAN may route NAS signalling from/to this UE to/from a default AMF.

The network, based on local policies, subscription changes and/or UE mobility, may change the set of permitted Network Slice(s) to which the UE is registered. The network may perform such change during a Registration procedure or trigger a notification towards the UE of the change of the supported Network Slices using an RM procedure (which may trigger a Registration procedure). The Network may provide the UE with a new Allowed NSSAI and Tracking Area list.

During a Registration procedure in a PLMN, in case the network decides that the UE should be served by a different AMF based on Network Slice(s) aspects, then the AMF that first received the Registration Request may redirect the Registration request to another AMF via the RAN or via direct signaling between the initial AMF and the target AMF.

The network operator may provision the UE with Network Slice selection policy (NSSP). The NSSP includes one or more NSSP rules. An NSSP rule may associate an application with a certain S-NSSAI. A default rule which matches one or more applications to a S-NSSAI may also be included. When a UE application associated with a specific S-NSSAI requests data transmission, then:

If the UE has one or more PDU sessions established corresponding to the specific S-NSSAI, the UE may route the user data of this application in one of these PDU sessions, unless other conditions in the UE prohibit the use of these PDU sessions. If the application provides a DNN, then the UE may consider also this DNN to determine which PDU session to use.

If the UE does not have a PDU session established with this specific S-NSSAI, the UE may request a new PDU session corresponding to this S-NSSAI and with the DNN that may be provided by the application. In order for the RAN to select a proper resource for supporting network slicing in the RAN, RAN may be aware of the Network Slices used by the UE.

The AMF may select an SMF in a Network Slice instance based on S-NSSAI, DNN and other information e.g. UE subscription and local operator policies, when the UE triggers the establishment of a PDU session. The selected SMF may establish a PDU session based on S-NSSAI and DNN.

In an example, in order to support network-controlled privacy of slice information for the slices the UE accesses, when the UE is aware or configured that privacy considerations apply to NSSAI: The UE may not comprise NSSAI in NAS signaling unless the UE has a NAS security context and the UE may not comprise NSSAI in unprotected RRC signaling.

For roaming scenarios, the Network Slice specific network functions in VPLMN and HPLMN may be selected based on the S-NSSAI provided by the UE during PDU connection establishment. If a standardized S-NSSAI is used, then selections of slice specific NF instances may be done by each PLMN based on the provided S-NSSAI. Otherwise, the VPLMN may map the S-NSSAI of HPLMN to a S-NSSAI of VPLMN based on roaming agreement (including mapping to a default S-NSSAI of VPLMN). The selection of slice specific NF instance in VPLMN may be done based on the S-NSSAI of VPLMN. The selection of any slice specific NF instance in HPLMN may be based on the S-NSSAI of HPLMN.

Figure 12:
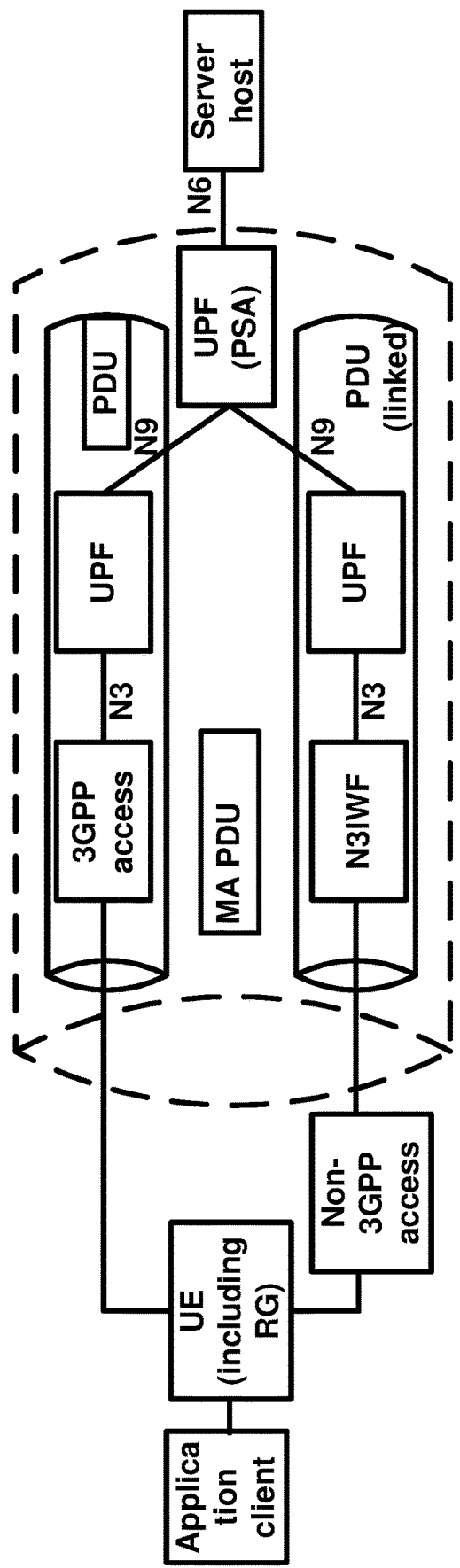
FIG. 12 is an example diagram depicting MA PDU session over 3GPP access and non-3GPP access as per an aspect of an embodiment of the present disclosure.

Based on policies from network operators, user preference settings and link performance of available access networks, a network may support a traffic management when a PDU session is established using plurality of available radio access networks, referred as multi-access PDU session. In an example, the network may comprise access network (e.g. 5G (R)AN) and/or core network (e.g. 5G core network). For example, the access network may comprise at least one base station (e.g. gNB). For example, the core network may comprise at least one network function/node (e.g. SMF). A traffic management of the multi-access PDU session may comprise traffic steering, switching and splitting of the data traffic. A single-access PDU may be a PDU session for the wireless device that uses a single radio access network. FIG. 12 is an example diagram depicting MA PDU session over 3GPP access and non-3GPP access.

In an example, UE Route Selection Policies (URSPs) rule may be used by the wireless network system to enable a wireless device to identify the need for a multiple access packet data unit (MA-PDU) session based on one or more traffic descriptors. The URSP rule may consist of at least one route selection descriptor that determines when the URSP rule is applicable. The route selection descriptor may comprise of a unique precedence value.

When multi-access PDU session is invoked by the UE, at least one traffic steering, switching and splitting (ATSSS) policy rule may be provided by a policy control function (PCF) to a session management function (SMF) during MA-PDU session establishment. The SMF may be responsible for mapping the ATSSS policy into traffic rules (descriptors) towards the wireless device via N1 interface and user plane function (UPF) via N4 interface. The SMF may also consider a local configuration when deriving at least one ATSSS policy rule. Based on ATSSS policy rule(s), the wireless device and UPF or PDU session anchor (PSA) may determine appropriate access networks to use for traffic steering, switching and splitting.

In an example, a wireless device may send an indicator that indicates the availability of a plurality of access networks when it requests session establishment to the network. In an example, the request received with the indicator of the availability of the plurality of access networks from the wireless device may be for establishing a single-access PDU session. The network may decide to establish a multi-access PDU session instead of the requested single-access PDU session. In an example, the request received with the indicator of the availability of the plurality of access networks from the wireless device may be for establishing a multi-access PDU session. The network may decide to establish a multi-access PDU session as requested. In an example, the request received with the indicator of the availability of the plurality of access networks from the wireless device may be for establishing a single-access PDU session. The network may decide to establish a single-PDU session as requested.

In an example, a decision to establish a multi-access PDU session may be at the time of establishment of a first (single-access) PDU session. In an example, modification of an existing single-PDU session to a multi-access PDU session may not be supported after the single-PDU session is established. During the lifetime of the single PDU session, the network may identify an overload or congestion (or leading to congestion) traffic condition, a need for traffic load balancing, a need for network maintenance, a shortage of network resources or failure of network component(s), and/or the like. It may be more beneficial to offload the traffic of the single PDU session to another available access network in such situation(s).

An existing single PDU session may be modified to a multi-access PDU session such that a traffic condition may be improved or traffic congestion/overloading may be avoided without having an impact on the quality of service(s) provided to the end user. In an example, a service quality may be improved due to better handling of the network traffic by the additionally available access network(s) of the multi-access PDU session. In an example, a wireless device may receive a request from a network indicating a request to modify a single-access PDU session to a multi-access PDU session using a second access network, after the single-access PDU session is established using a first access network. The first and second access network may be any one of a 3GPP access network, a non-3GPP access network, a WiFi network, a 5G network, an LTE network, or a WCDMA network, for example. If the second access network is available, the wireless device may modify the existing single PDU session to a multi-access PDU session.

In an example, a wireless device may establish two separate single-access PDU sessions. A first single-access PDU session may be established using a first access network and a second single-access PDU session may be established using a second access network. The first single-access PDU session and second single-access PDU session may be linked together to form a multi-access PDU session. The first single-access PDU session may be established first. The wireless device may provide a link indicator to a network when the wireless device requests a PDU session establishment of the second single-access PDU session. A presence of the link indicator in (or provided with) the establishment request of the second single-access PDU session may indicate to the network a request for establishing a multi-access PDU session from the wireless device by linking together the first and second single-access PDU sessions. A session identifier of the first single PDU session, and a session identifier of the second PDU session may be different.

In an example, a wireless device may establish two single-access PDU sessions in parallel by sending a request for establishing a multi-access PDU session. The wireless device may initiate establishment of the first of the two single-access PDU sessions using a first access network comprising a multi-access PDU request indicator. The network may initiate establishment of the second of the two single-access PDU sessions using a second access network. A session identifier of the first single-access PDU session and a session identifier of the second single-access PDU session may be different.

In an example, a wireless device may establish two separate single-access PDU sessions. The first of the two single-access PDU sessions may be established using a first access network. The second of the two single-access PDU sessions may be established using a second access network. The first single-access PDU session and the second single-access PDU session may be linked together to form a single multi-access PDU session. The first single-access PDU session may be established first. The wireless device may provide a multi-access PDU request indicator to a network and a request type as existing PDU session when the wireless device requests a PDU session establishment of the second single-access PDU session. A presence of the multi-access PDU request indicator in the establishment request of the second single-access PDU session may indicate a request for establishing a multi-access PDU session. A session identifier of the first single-access PDU session and a session identifier of the second single-access PDU session may be the same. In an example, a wireless device may establish two single-access PDU sessions in parallel by sending a request for establishing a multi-access PDU session. The wireless device may initiate establishment (via an establishment request) of the first of the two single-PDU sessions using a first access network. The establishment request may comprise a multi-access PDU request indicator. The network may initiate an establishment of the second of the two single-access PDU sessions. A session identifier of the first single-access PDU session and a session identifier of the second single-access PDU session may be the same.

In an example, a wireless device may send a PDU session establishment request for a single-access PDU session using a first access network comprising a multi-access PDU capability indication. The multi-access capability indication may indicate that the wireless device supports a multi-access PDU session even though the request is for establishing a single-access PDU session. The network may, based on the indication, modify establishment of the first single-PDU session to a multi-access PDU session at the time of establishment of the first-access PDU session.

In an example, a wireless device or a network may modify av multi-access PDU session to a single-access PDU session. A determination of the modification may be based on updates to allowed network slice selection assistance information and/or the like.

In an example, an access traffic steering, switching and splitting (ATSSS) decision for a multiple-access PDU session may be based on a policy. A policy rule for the access traffic steering, switching and splitting may be referred as an ATSSS rule. An ATSSS rule may be provisioned in a wireless device or in a network. A policy control function (PCF) may provide at least one ATSSS rule during establishment of a multi-access PDU. The ATSSS rule may determine a user traffic distribution of the multi-access PDU. In an example, the ATSSS rule is for steering traffic such that selected traffic of the multi-access PDU session is transmitted over a selected one of the first or second access networks. In an example, the ATSSS rule is for switching traffic such that all on-going data traffic of the multi-access PDU session is moved from one of the first and second access networks to the other one of the first and second access networks. In an example, the ATSSS rule is for splitting traffic such that traffic of the multi-access PDU session is simultaneously transmitted over both the first and second access networks.

In an example, there may be multiple modes of user traffic distribution for a multi-access PDU session that uses multiple access networks. These modes may be applicable to traffic steering, traffic switching, or traffic splitting. Examples modes of traffic steering, traffic switching, or traffic splitting may comprise, for example, load-balance, hot-standby, top-up, least-loaded, best-performance, and/or the like.

In an example, in load-balance mode, data traffic may be split over the multiple access networks of the multi-access PDU session for equal or weighted distribution.

In an example, in top-up mode, data traffic steered to least cost access network and, if needed, split across both access networks when the performance criteria of the least cost access falls below one or more performance thresholds based on, for example, link quality, throughput, latency, packet loss, etc.

In an example, in least-loaded mode, data traffic is steered to the least loaded access network and switched to the other access network when the least loaded access network is no longer available, or its link condition falls below one or more performance thresholds based on, for example, link quality, throughput, latency, packet loss, etc.

In an example, in best-performance mode, data traffic may be steered to the best performing access network based on traffic measurements.

In an example, during the establishment of a multi-access PDU session, an SMF may obtain an ATSSS rule for the multi-access PDU session from a PCF. The SMF may send the ATSSS rule to a wireless device via an AMF when the ATSSS rule is for uplink traffic steering. The SMF may send the ATSSS rule to a UPF when the ATSSS rule is for downlink traffic steering.

Figure 13:
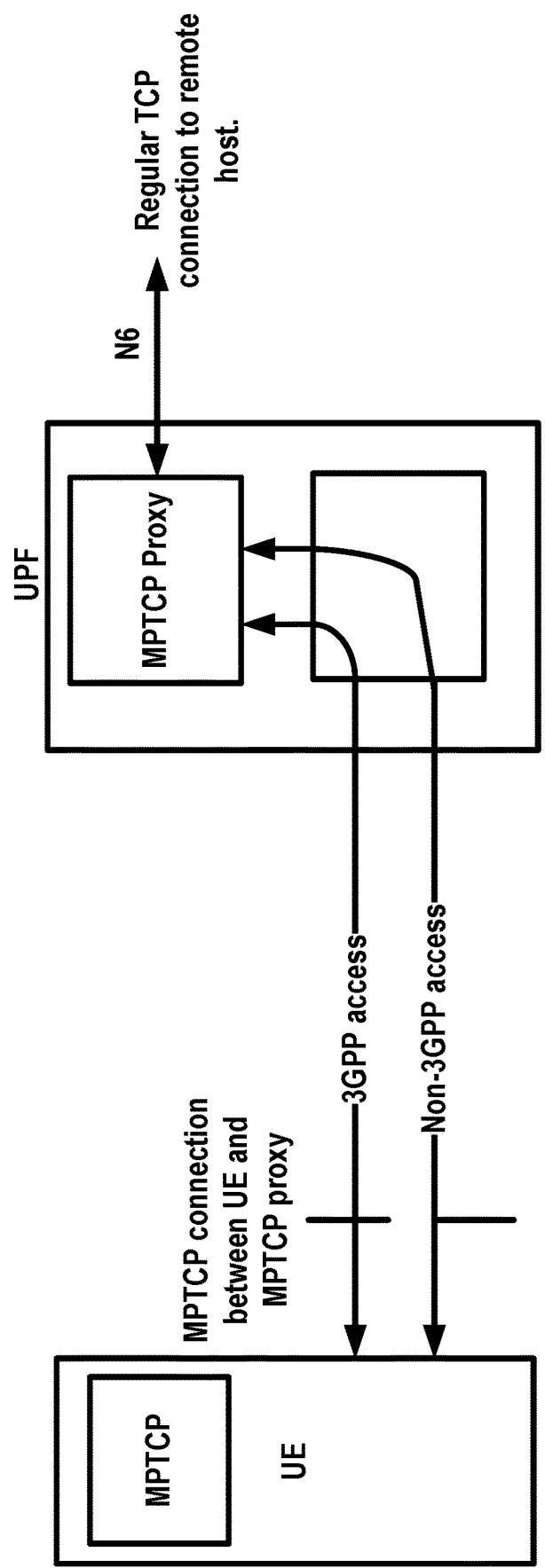
FIG. 13 is an example diagram depicting MPTCP connection over 3GPP access and non-3GPP access as per an aspect of an embodiment of the present disclosure.

In an example, a multi-path Transmission Control Protocol (MPTCP) mechanism may enable ending and receiving traffic over a plurality of paths simultaneously over different access networks. In an example, a MPTCP PDU session may support the traffic over a first access network. In an example, a MPTCP PDU session may support the traffic over a second access network. A MPTCP PDU session may be supported by a wireless device, where the wireless device is a MPTCP host. A MPTCP PDU session may be supported by a UPF, where the UPF is a MPTCP proxy. A MPTCP configuration information for supporting MPTCP may be exchanged between the wireless device and the UPF when a MPTCP PDU session established using MPTCP. The MPTCP configuration information may be exchange over a user plane between the wireless device and the UPF. The MPTCP configuration information may be exchanged over a control plane between the wireless device and the UPF. FIG. 13 is an example diagram depicting MPTCP connection over 3GPP access and non-3GPP access.

In an example, a MPTCP PDU session may be established separately using same session identifier by the wireless device. The MPTCP PDU session may be established separately using different session identifiers. A first MPTCP PDU session may be established using a first access network by the wireless device. The wireless device may use a multi-access PDU session request indicator in the first MPTCP PDU session. A second MPTCP PDU session may be established using a second access network by the wireless device.

In an example, a MPTCP PDU session may be established in parallel using same session identifier by the wireless device. The MPTCP PDU session may be established in parallel using different session identifiers. A first MPTCP PDU session may be established using a first access network by the wireless device. The wireless device may use a multi-access PDU request indicator in the first MPTCP PDU session. A second MPTCP PDU session may be established using a second access network by the network. A terminology in parallel may refer to establishment of MPTCP PDU sessions using only one MPTCP PDU request from the wireless device comprising a multi-access PDU request indicator and/or at least one access network (radio access type and/or the like)

Figure 14:
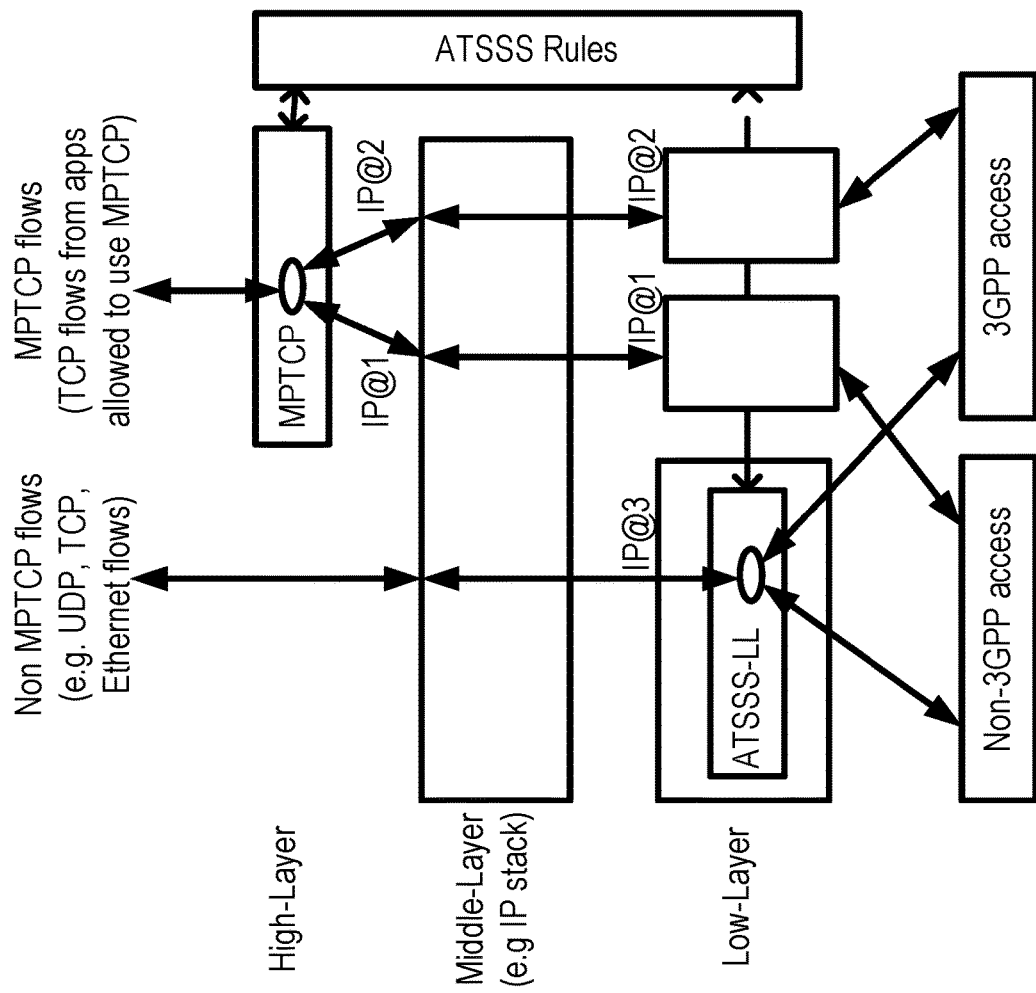
FIG. 14 is an example diagram depicting ATSSS-capable UE supporting the MPTCP functionality and the ATSSS-LL functionality as per an aspect of an embodiment of the present disclosure.
Figure 15:
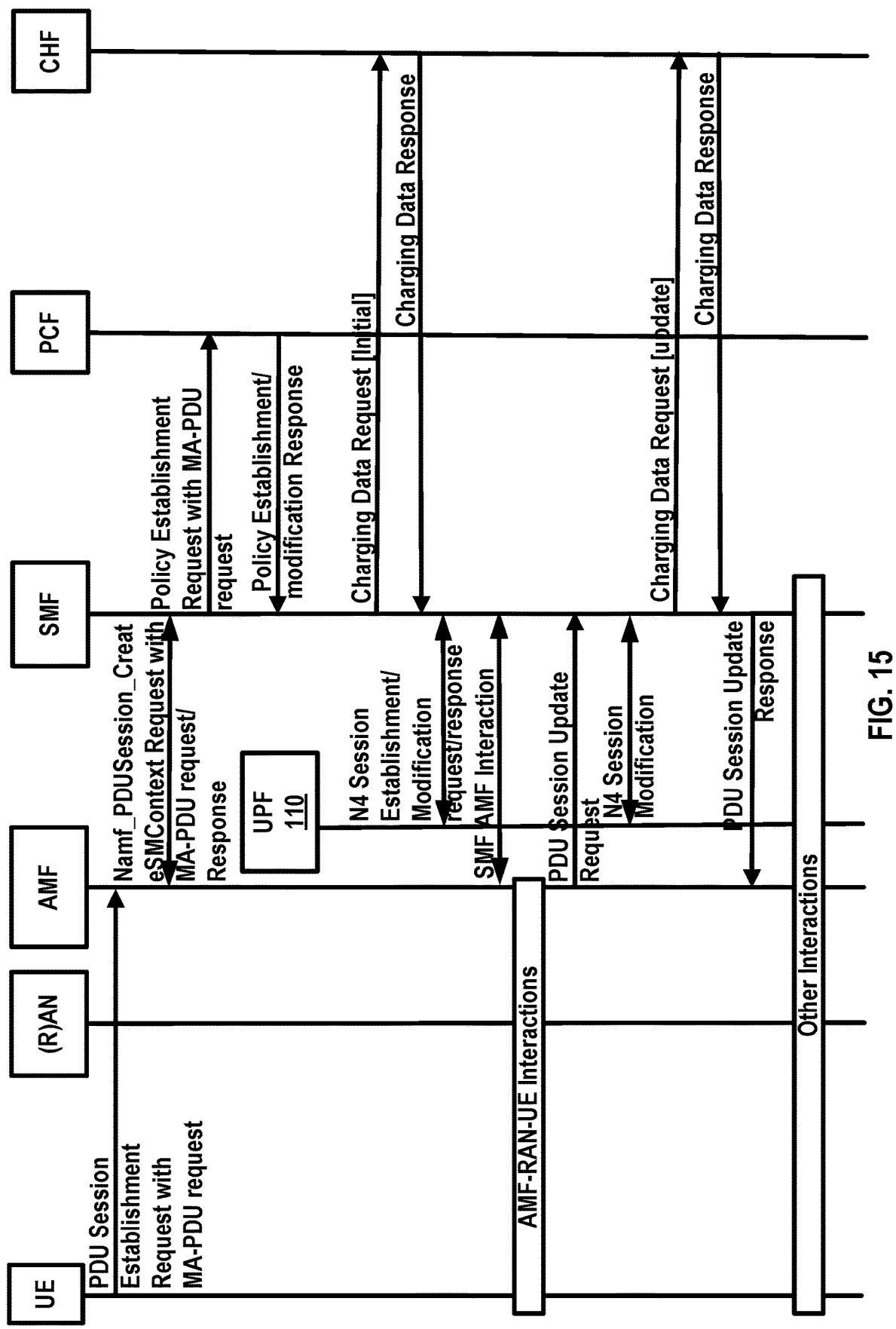
FIG. 15 is an example call flow for a UE requested MA-PDU session establishment procedure as per an aspect of an embodiment of the present disclosure.

FIG. 14 is an example diagram depicting ATSSS-capable UE supporting the MPTCP functionality and the ATSSS-LL functionality. FIG. 15 is an example call flow for a UE requested MA-PDU session establishment procedure as per an aspect of an embodiment of the present disclosure. In an example, the UE may send to an AMF a PDU session establishment request message, the PDU session establishment request message may comprise "MA PDU Request" indication and an ATSSS Capability (e.g. an "MPTCP Capability" and/or an "ATSSS-LL Capability"). The "MA PDU Request" indication and the Request Type="initial request" may indicate to the network that this PDU session establishment request may be to establish a new MA PDU Session and to apply the ATSSS-LL functionality, or the MPTCP functionality, or both functionalities, for steering the traffic of this MA PDU session. If the UE requests an S-NSSAI and the UE is registered over both accesses, the UE may request an S-NSSAI that is allowed on both accesses.

If the AMF supports MA PDU sessions, the AMF may select an SMF which supports MA PDU sessions. The AMF may send to the SMF a Namf_PDUSession_CreateSMContext request message comprising the "MA PDU Request" indication to inform the SMF that the request is for a MA PDU Session. The AMF may in addition indicate to SMF whether the UE is registered over both accesses. If the AMF determines that the UE is registered via both accesses but the requested S-NSSAI is not allowed on both accesses, the AMF may reject the MA PDU session establishment. The SMF may send the "MA PDU Request" indication to a PCF in the SM policy control create message. The PCF may decide whether the MA PDU session is allowed or not based on operator policy and subscription data. The PCF may provide PCC rules for the MA PDU session, e.g. PCC rules may comprise ATSSS policy control information. From the received PCC rules, the SMF may derive ATSSS rules, which will be sent to UE for controlling the traffic steering, switching and splitting in the uplink direction. The SMF may derive N4 rules from the received PCC rules, which may be sent to UPF for controlling the traffic steering, switching and splitting in the downlink direction. If the UE indicates the support of "ATSSS-LL Capability", the SMF may derive the measurement assistance information. The SMF may establishes user-plane resources over the 3GPP access, e.g. over the access where the PDU session establishment request was sent on. For example, the N4 rules derived by SMF for the MA PDU session may be sent to UPF. If the ATSSS Capability for the MA PDU Session indicates "ATSSS-LL Capability", the SMF may comprise information for measurement into the N4 rule to instruct the UPF to initiate performance measurement for this MA PDU Session. In step 10a, the UPF allocates addressing information for the Performance Measurement Function (PMF) in the UPF. In step 10b, the UPF sends the addressing information for the PMF in the UPF to the SMF.

The UE may receive from the AMF a PDU session establishment accept message, which may indicate to UE that the requested MA PDU session was successfully established. This message may comprise the ATSSS rules for the MA PDU session, which were derived by SMF. If the ATSSS Capability for the MA PDU Session indicates "ATSSS-LL Capability", the SMF may comprise the addressing information of PMF in the UPF into the measurement assistance information. If the SMF was informed that the UE is registered over both accesses, the SMF may initiate the establishment of user-plane resources over non-3GPP access. The SMF may send an N1N2 Message Transfer to AMF including N2 SM Information and may indicate to AMF that the N2 SM Information may be sent over non-3GPP access.

Existing technologies may not efficiently support user policy control. In existing technologies, a wireless device may only send UE session capability to a network when the wireless device initiates a PDU session establishment procedure. As a result, the network (e.g. PCF) may not be able to determine a URSP rule based on the UE session capability and send the URSP rule to the wireless device before the PDU session establishment procedure. In existing technologies, a wireless device may only send UE multiple access capability to a network when the wireless device initiates a multiple access PDU session establishment procedure. As a result, the network (e.g. PCF) may not be able to determine a URSP rule for multiple accesses based on the UE multiple access capability and send the URSP rule to the wireless device before the multiple access PDU session establishment procedure. Existing technologies may not enable a wireless device to receive a URSP rule for PDU session before the wireless device initiates a PDU session (e.g. a multiple access PDU session).

Existing technologies may have issues efficiently supporting QoS policy control in a roaming scenario (e.g. home routed roaming). For example, existing technologies may enable a home SMF (HSMF) to determine a QoS rule without considering the QoS capability of a VPLMN. This may have the problem that the determined QoS rule may not be supported by the VPLMN (e.g. the determined QoS parameters by HPLMN may exceed the capability of the VPLMN).

Existing technologies may have issues efficiently supporting multiple access control. For example, existing technologies may enable a network function (e.g. HPCF, VPCF, SMF) to support different multiple access type (e.g. MA PDU, MPTCP), which may have the problem that a wireless device may not be able to select a network preferred multiple access type. For example, implementation of existing technologies may enable both VPLMN and HPLMN supporting different multiple access type (e.g. MA PDU, MPTCP), which may have the problem that without negotiation different capability of VPLMN and HPLMN, the HPLMN (e.g. HPCF) may determine a priority for different multiple access type which may not be supported by the VPLMN efficiently.

Example embodiments of the present disclosure may provide enhanced mechanisms for implementing user policy control. Example embodiments of the present disclosure may provide enhanced mechanisms for implementing user policy control by enabling a wireless device to send UE session capability to a network before the wireless device initiates a PDU session establishment, which may enable the network (e.g. PCF) to determine a URSP rule based on UE session capability. Example embodiments of the present disclosure may provide enhanced mechanisms for implementing user policy control by enabling a wireless device to send UE multiple access capability information to a network before the wireless device initiates a multiple access PDU session establishment, which may enable the network (e.g. PCF) to determine a URSP rule for multiple access based on UE multiple access capability. Example embodiments of the present disclosure may provide enhanced mechanisms for implementing user policy control by enabling a wireless device to get a URSP rule for a PDU session before the wireless devices initiates a PDU session (e.g. a multiple access PDU session).

Example embodiments of the present disclosure may provide enhanced mechanisms to implement QoS policy control in a roaming scenario (e.g. home routed roaming). Example embodiments of the present disclosure may provide enhanced mechanisms to enable a visited SMF (VSMF) to get QoS capability of visited PLMN (VPLMN) and send the QoS capability of VPLMN to a home SMF (HSMF), which may enable the home PLMN (HPLMN) (e.g. HSMF, HPCF) to determine a QoS rule based on the QoS capability of VPLMN.

Example embodiments of the present disclosure may provide enhanced mechanisms to efficiently support multiple access control. Example embodiments of the present disclosure may provide enhanced mechanisms to enable a network function (e.g. HPCF, VPCF, SMF) to determine a priority of different multiple access type (e.g. a priority of MA PDU, a priority of MPTCP), which may enable a wireless device to select a network preferred multiple access type. Example embodiments of the present disclosure may provide enhanced mechanisms to enable VPLMN (e.g. VSMF) to indicate the visited PLMN capability of supporting different multiple access type (e.g. a priority of MA PDU, a priority of MPTCP), which may enable a home PLMN (e.g. HPCF) to determine a priority for different multiple access type (e.g. a priority of MA PDU, a priority of MPTCP) based on the visited PLMN capability of supporting different multiple access type.

Figure 16:
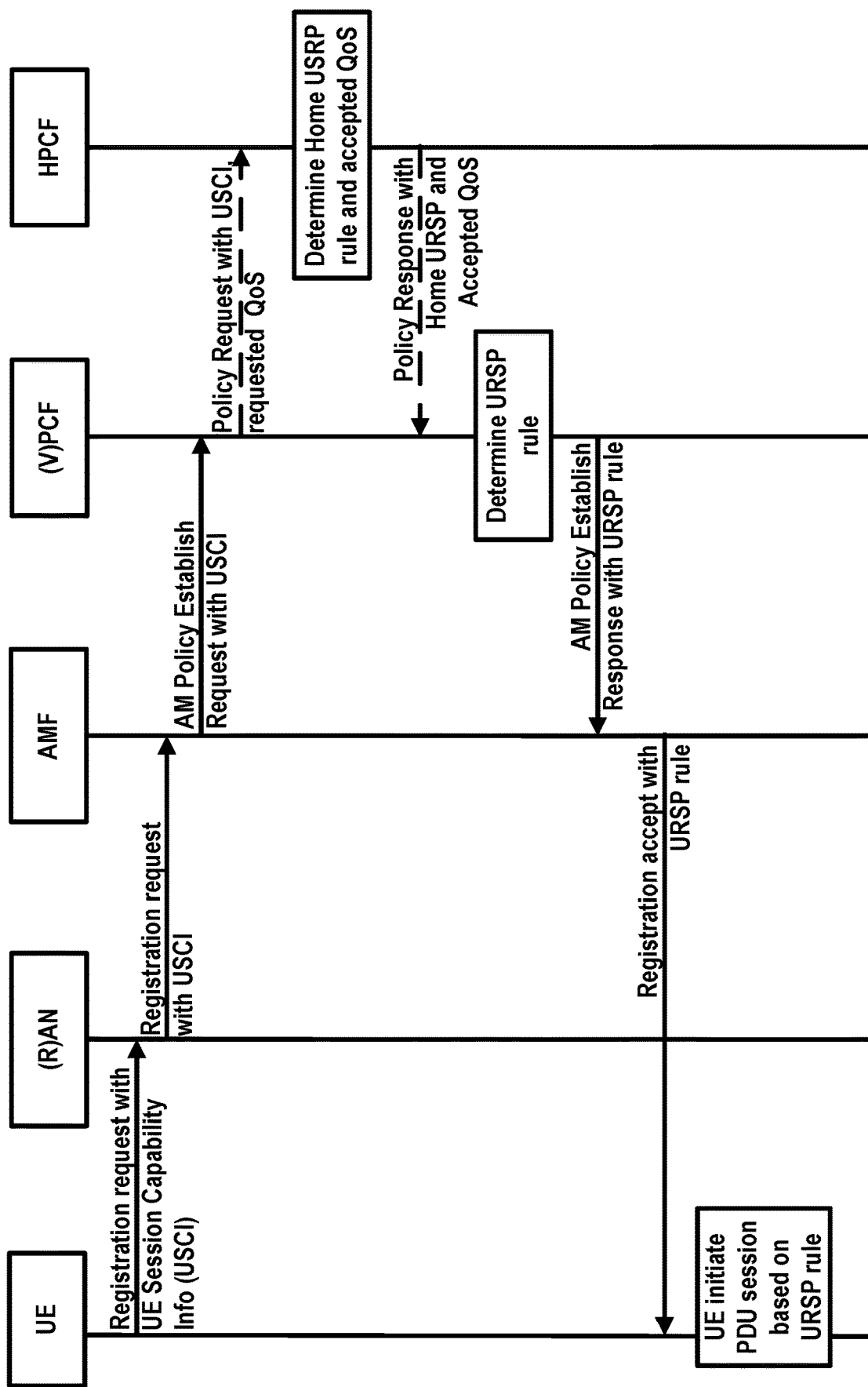
FIG. 16 is an example call flow as per an aspect of an embodiment of the present disclosure.

FIG. 16 shows example call flows that may comprise one or more actions. In an example, a UE may send an AN message to a base station (e.g. (R)AN). In an example, the AN message may be an RRC setup complete message. The AN message may comprise AN parameters and/or a registration request message. The AN parameters may comprise at least one of: UE session capability information, an UE identity (e.g. 5G-S-TMSI/GUAMI/IMSI), a selected PLMN ID, requested NSSAI, and/or establishment cause. The registration request message may comprise at least one of: UE session capability information, registration type, UE identity (e.g. SUCI/5G-GUTI/PEI), selected PLMN ID, last visited TAI (if available), security parameters, requested NSSAI, UE Radio Capability Update, UE MM Core Network Capability, PDU Session status, or List Of PDU Sessions To Be Activated).

The UE session capability information may indicate the UE session capability. The UE session capability information may comprise at least one of: a 5GSM core network capability information; a UE multiple access packet data unit (MA-PDU) capability indication; or a UE access traffic steering switch and splitting (ATSSS) capability indication. The 5GSM core network capability information may indicate that the UE supports "Ethernet" PDU Session Type supported in EPC as PDN Type "Ethernet". The 5GSM core network capability information may indicate that the UE supports Reflective QoS. The 5GSM core network capability information may indicate that the UE supports Multi-homed IPv6 PDU Session (only if the Requested PDU Type was set to "IPv6" or "IPv4v6"). The UE MA-PDU capability indication may indicate that the UE supports MA PDU session. The MA PDU session may be a PDU session that provides a PDU connectivity service, which may use one access network at a time, or simultaneously one 3GPP access network and one non-3GPP access network. The MA PDU session may be a PDU Session that has user-plane resources on two access networks. The UE ATSSS capability indication may indicate that the UE supports ATSSS feature/function. The UE ATSSS capability indication may comprise a UE MPTCP capability indication. The UE ATSSS capability indication may comprise a UE access traffic steering switch and splitting low-layer (ATSSS-LL) functionality capability indication. The UE MPTCP capability indication may indicate that the UE supports MPTCP feature/function/protocol. The UE ATSSS-LL functionality capability indication may indicate that the UE supports the ATSSS-LL functionality. For example, the ATSSS-LL functionality may be a data switching function, which may decide how to steer, switch and split the uplink traffic across 3GPP and non-3GPP accesses, based on the provisioned ATSSS rules and local conditions (e.g. signal loss conditions). The ATSSS-LL functionality in the UE may be applied to steer, switch and split all types of traffic, including TCP traffic, UDP traffic, Ethernet traffic, and/or the like.

In response to the AN message received, the (R)AN may select an AMF and send to the AMF a N2 message. The N2 message may comprise N2 parameters, the registration request message, and/or UE policy container. The N2 parameters may comprise at least one of: the selected PLMN ID, location information and cell identity related to the cell in which the UE is camping, UE context request which may indicate that a UE context including security information needs to be setup at the (R)AN, and/or the establishment cause.

In response to the message received from the (R)AN, the AMF make take one or more actions. In an example, the AMF may select a PCF. For example, the AMF may select a PCF in non-roaming scenario. For example, the AMF may select a VPCF in roaming scenario. For example, the AMF may send to the PCF a message (e.g. AM policy association establishment request). For example, the AMF may send to the VPCF a message (e.g. AM policy association establishment request) for roaming scenario. The AM policy association establishment request message may comprise at least one of: the UE session capability information, the UE identity (e.g. SUPI), Allowed NSSAI, Access Type and RAT, PEI, ULI, UE time zone, Serving Network and UE Policy Container (the list of stored PSIs, operating system identifier, Indication of UE support for ANDSP). In roaming scenario, based on operator policies, the AMF may provide to the VPCF the PCF ID of the selected HPCF.

In an example of a non-roaming scenario and/or local breakout scenario, in response to the message received from the AMF, the PCF may take one or more actions. In an example action, the PCF may determine a URSP rule based on the information received from the AMF. For example, the PCF may determine a URSP rule based on the UE session capability information. For example, the PCF may determine a URSP rule based on the 5GSM core network capability information. For example, the PCF may determine PDU session type selection information in a URSP rule based on the 5GSM core network capability information (e.g. "Ethernet" PDU Session Type supported in EPC as PDN Type "Ethernet"). For example, the PCF may determine PDU session type selection information in a URSP rule based on the 5GSM core network capability information (e.g. Multi-homed IPv6 PDU Session). For example, the PCF may determine a URSP rule based on the UE MA-PDU capability indication. For example, the PCF may determine a URSP rule based on the UE ATSSS capability indication. For example, the URSP rule determined by the PCF may comprise multiple access information. The multiple access information may comprise at least one of: a network MA-PDU capability indication; a network ATSSS capability indication; a priority of MA-PDU; a priority of MPTCP; or a priority of ATSSS-LL. For example, the network MA-PDU capability indication may indicate that the network may support the MA PDU session. The network ATSSS capability indication may indicate that the network may support MPTCP feature/function/protocol and/or ATSSS-LL feature/function. The priority of MA-PDU, the priority of MPTCP, and/or the priority of ATSSS-LL may indicate the network preference/priority of multiple access. For example, the network may set the priority of MA-PDU as 1 (e.g. highest priority), set the priority of MPTCP as 2, and set the priority of ATSSS-LL as 3 (e.g. lowest priority), to indicate UE to apply multiple access based on the priority (e.g. the network prefer to the MA-PDU compare to the MPTCP and/or ATSSS-LL). In an example action, the PCF may send to the AMF a response message (e.g. AM policy establishment response). The AM policy establishment response may comprise the URSP rule, where the URSP rule may comprise the PDU session type selection information and/or the multiple access information. In response to the message received from the PCF, the AMF may send to the UE a message (e.g. registration accept message) comprising the URSP rule, where the URSP rule may comprise the PDU session type selection information and/or the multiple access information.

In an example of a local breakout scenario and/or home routed roaming scenario, in response to the message received from the AMF, the VPCF may take one or more actions. In an example action, based on information received from the AMF (e.g. the UE session capability information) and/or local operator policy and/or network resource and/or UE subscription information, the VPCF may determine a visited QoS capability for a PDU session for the UE. The visited QoS capability may comprise at least one of the following QoS parameters for visited PLMN (VPLMN): 5QI/QCI, ARP, RQA, GFBR, MFBR, Session-AMBR, UE-AMBR, and/or maximum packet loss rate. In an example action, the VPCF may send to a home PCF (HPCF) a message (e.g. policy request). The policy request message may comprise the information received from the AMF (e.g. the UE session capability information) and/or the visited QoS capability. In response to the message received from the VPCF, the HPCF may take one or more actions. In an example action, based on the information received from the VPCF, the HPCF may determine home URSP rule and/or accepted QoS information for a PDU session for the UE. For example, the HPCF may determine a home URSP rule based on the 5GSM core network capability information received from the VPCF. For example, the HPCF may determine PDU session type selection information in a home URSP rule based on the 5GSM core network capability information (e.g. "Ethernet" PDU Session Type supported in EPC as PDN Type "Ethernet"). For example, the HPCF may determine PDU session type selection information in a home URSP rule based on the 5GSM core network capability information (e.g. Multi-homed IPv6 PDU Session). For example, the HPCF may determine a home URSP rule based on the UE MA-PDU capability indication. For example, the HPCF may determine a home URSP rule based on the UE ATSSS capability indication. For example, based on the visited QoS capability received from the VPCF and/or local operator policy and/or UE subscription information, the HPCF may determine accepted QoS information for a PDU session for the UE. For example, the allowed GFBR is 20 Mbits in the subscription information and the GFBR of visited QoS capability is 10 Mbits, the HPCF may determine GFBR of accepted QoS to 10 Mbits which may be supported by the VPLMN. In an example action, the HPCF may send a response message (e.g. policy response) to the VPCF. The policy response message may comprise the home URSP rule and/or the accepted QoS information. In response to the message received from the HPCF, the VPCF may determine a visited URSP rule based on the home URSP rule. The visited URSP may be the same as the home URSP rule. The visited URSP may be different from the home URSP rule. In an example action, the VPCF may send to the AMF a response message (e.g. AM policy establish response). The AM policy establish response message may comprise the visited URSP rule and/or the accepted QoS information. In response to the message received from the VPCF, the AMF may send to the UE a message (e.g. registration accept message) comprising the visited URSP rule and/or the accepted QoS information, where the URSP rule may comprise the PDU session type selection information and/or the multiple access information.

Figure 18:
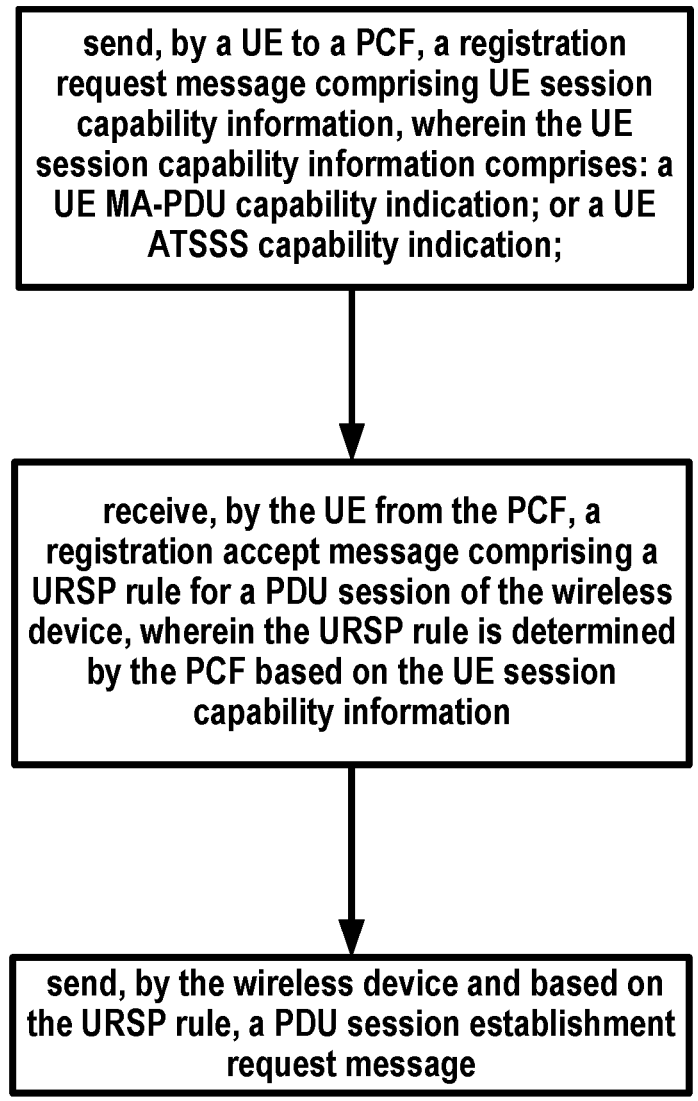
FIG. 18 is an example diagram depicting the procedures of UE as per an aspect of an embodiment of the present disclosure.

In response to the message received from the AMF, the UE may take one or more actions. For example, the UE may initiate a PDU session based on the URSP rule and/or the accepted QoS information. For example, the UE may initiate a PDU session based on the visited URSP rule and/or the accepted QoS information. For example, the UE may determine PDU session type based on the PDU session type selection information in the URSP rule. For example, the UE may determine PDU session type based on the PDU session type selection information in the visited URSP rule. For example, the UE may initiate a PDU session based on the accepted QoS information (e.g. the QoS of the PDU session does not exceed the accepted QoS information). For example, the UE may initiate a multiple PDU session based on the multiple access information in the URSP rule. FIG. 18 is an example diagram depicting the procedures of UE as per an aspect of an embodiment of the present disclosure.

Figure 17:
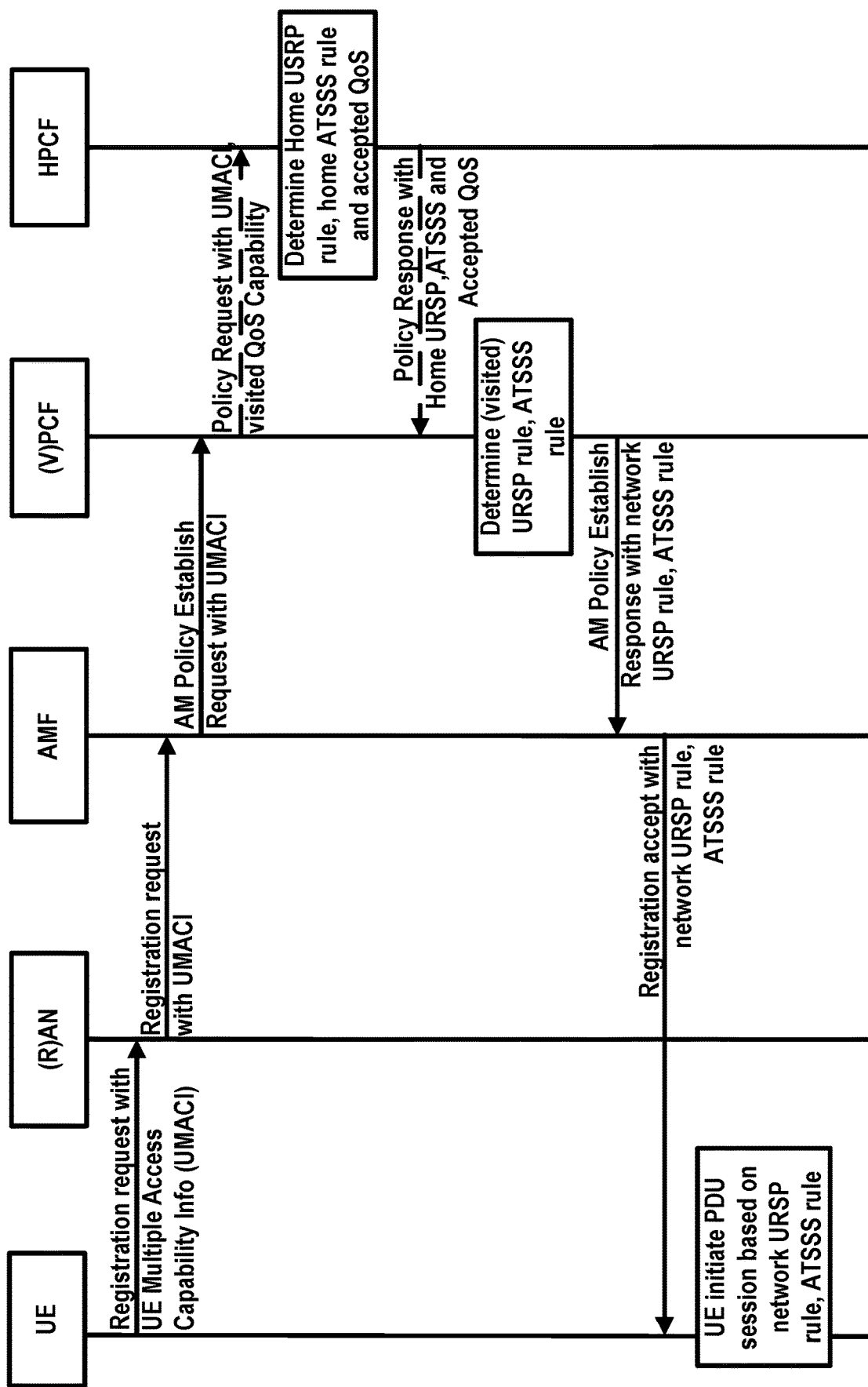
FIG. 17 is an example call flow as per an aspect of an embodiment of the present disclosure.

FIG. 17 shows example call flows that may comprise one or more actions. In an example, a UE may have multiple access capability. In order to get URSP rule and/or ATSSS rule for multiple access before the UE initiating a multiple access PDU session, the UE may send UE multiple access capability information to the network during UE registration procedure. The network (e.g. PCF) may determine URSP rule and/or ATSSS rule for multiple access based on the UE multiple access capability information and send to the UE the URSP rule and/or ATSSS rule. The UE may initiate multiple access PDU session based on the URSP rule and/or ATSSS rule for multiple access accordingly.

In an example, a UE may send an AN message to a base station (e.g. (R)AN). The AN message may comprise AN parameters and/or a registration request message. The AN parameters may comprise at least one of: UE multiple access capability information, an UE identity (e.g. 5G-S-TMSI/GUAMI/IMSI), a selected PLMN ID, requested NSSAI, and/or establishment cause. The registration request message may comprise at least one of: UE multiple access capability information, registration type, UE identity (e.g. SUCI/5G-GUTI/PEI), selected PLMN ID, last visited TAI (if available), security parameters, requested NSSAI, UE Radio Capability Update, UE MM Core Network Capability, PDU Session status, or List Of PDU Sessions To Be Activated).

The UE multiple access capability information may indicate that UE supports multiple access. The UE multiple access capability information may comprise at least one of: a UE multiple access packet data unit (MA-PDU) capability indication; or a UE access traffic steering switch and splitting (ATSSS) capability indication. The UE MA-PDU capability indication may indicate that the UE supports MA PDU session. The MA PDU session may be a PDU session that provides a PDU connectivity service, which may use one access network at a time, or simultaneously one 3GPP access network and one non-3GPP access network. The MA PDU session may be a PDU Session that has user-plane resources on two access networks. The UE ATSSS capability indication may indicate that the UE supports ATSSS feature/function. The UE ATSSS capability indication may comprise a UE MPTCP capability indication. The UE ATSSS capability indication may comprise a UE access traffic steering switch and splitting low-layer (ATSSS-LL) functionality capability indication. The UE MPTCP capability indication may indicate that the UE supports MPTCP feature/function/protocol. The UE ATSSS-LL functionality capability indication may indicate that the UE supports the ATSSS-LL functionality. For example, the ATSSS-LL functionality may be a data switching function, which may decide how to steer, switch and split the uplink traffic across 3GPP and non-3GPP accesses, based on the provisioned ATSSS rules and local conditions (e.g. signal loss conditions). The ATSSS-LL functionality in the UE may be applied to steer, switch and split all types of traffic, including TCP traffic, UDP traffic, Ethernet traffic, etc.

In response to the AN message received, the (R)AN may select an AMF and send to the AMF a N2 message. The N2 message may comprise N2 parameters, the registration request message and/or UE policy container. The N2 parameters may comprise at least one of: the selected PLMN ID, location information and cell identity related to the cell in which the UE is camping, UE context request which may indicate that a UE context including security information needs to be setup at the (R)AN, and/or the establishment cause.

In response to the message received from the (R)AN, the AMF make take one or more actions. In an example action, the AMF may select a PCF. For example, the AMF may select a VPCF in roaming scenario. For example, the AMF may send to the PCF a message (e.g. AM policy association establishment request). For example, the AMF may send to the VPCF a message (e.g. AM policy association establishment request). The AM policy association establishment request message may comprise at least one of: the UE multiple access capability information, the UE identity (e.g. SUPI), Allowed NSSAI, Access Type and RAT, PEI, ULI, UE time zone, Serving Network and UE Policy Container (the list of stored PSIs, operating system identifier, Indication of UE support for ANDSP). In roaming scenario, based on operator policies, the AMF may provide to the VPCF the PCF ID of the selected HPCF.

In an example of non-roaming scenario and/or local breakout scenario, in response to the message received from the AMF, the PCF may take one or more actions. In an example action, the PCF may determine a URSP rule and/or an ATSSS rule based on the information received from the AMF. For example, the PCF may determine a URSP rule and/or an ATSSS rule based on the UE multiple access capability information. For example, the PCF may determine a URSP rule and/or an ATSSS rule based on the UE MA-PDU capability indication. For example, the PCF may determine a URSP rule and/or an ATSSS rule based on the UE ATSSS capability indication. For example, the URSP rule and/or the ATSSS rule determined by the PCF may comprise multiple access information. The multiple access information may comprise at least one of: a network MA-PDU capability indication; a network ATSSS capability indication; a priority of MA-PDU; a priority of MPTCP; or a priority of ATSSS-LL. For example, the network MA-PDU capability indication may indicate that the network supports the MA PDU session. The network ATSSS capability indication may indicate that the network supports MPTCP feature/function/protocol and/or ATSSS-LL feature/function. The priority of MA-PDU, the priority of MPTCP, and/or the priority of ATSSS-LL may indicate the network's preference/priority of multiple access. For example, the network may set the priority of MA-PDU as 1 (e.g. highest priority), set the priority of MPTCP as 2, and set the priority of ATSSS-LL as 3 (e.g. lowest priority), to indicate UE to apply multiple access based on the priority (e.g. the network prefer to the MA-PDU compare to the MPTCP and/or ATSSS-LL). The following are example URSP rules and ATSSS rules.

URSP rule 1:
>Application/traffic type: eMBB
>PDU Session Type Selection: Ethernet
>Access Type preference: Multiple access
>Multiple access information:
>>network MA-PDU capability indication;
>>network ATSSS capability indication;
>>priority of MA-PDU;
>>priority of MPTCP; and
>>priority of ATSSS-LL.

URSP rule 2:
>Application/traffic type: URLLC
>PDU Session Type Selection: IP
>Access Type preference: Multiple access
>Multiple access information:
>>network ATSSS capability indication;
>>priority of MPTCP; and
>>priority of ATSSS-LL.

ATSSS rule 1:
>Traffic Descriptor: UDP, DestAddr: 1.2.3.4
>Steering Mode: Active-Standby
>Multiple access information:
>>network ATSSS capability indication;
>>priority of MPTCP: 2; and
>>priority of ATSSS-LL: 1 (Highest).

ATSSS rule 2:
>Traffic Descriptor: TCP, DestPort: 8080
>Steering Mode: Smallest Delay
>Multiple access information:
>>network ATSSS capability indication;
>>priority of MPTCP: 1 (Highest); and
>>priority of ATSSS-LL: 2.

In an example action, the PCF may send to the AMF a response message (e.g. AM policy establishment response). The AM policy establishment response may comprise the URSP rule and/or the ATSSS rule for multiple access for the UE. The URSP rule may comprise the PDU session type selection information and/or the multiple access information. The ATSSS rule may comprise the multiple access information. In response to the message received from the PCF, the AMF may send to the UE a message (e.g. registration accept message) comprising the URSP rule and/or the ATSSS rule. The URSP rule may comprise the PDU session type selection information and/or the multiple access information. The ATSSS rule may comprise the multiple access information.

In an example of local breakout scenario and/or home routed roaming scenario, in response to the message received from the AMF, the VPCF may take one or more actions. In an example action, based on information received from the AMF (e.g. the UE multiple access capability information) and/or local operator policy and/or network resource and/or UE subscription information, the VPCF may determine a visited QoS capability for multiple access for the UE, wherein the multiple access may be a MA PDU session, and/or a PDU session using MPTCP, and/or a PDU session using ATSSS-LL. The visited QoS capability may comprise at least one of the following QoS parameters for visited PLMN (VPLMN): 5QI/QCI, ARP, RQA, GFBR, MFBR, Session-AMBR, UE-AMBR, and/or maximum packet loss rate. In an example action, the VPCF may send to a home PCF (HPCF) a message (e.g. policy request). The policy request message may comprise the information received from the AMF (e.g. the UE multiple access capability information) and/or the visited QoS capability for the multiple access. In an example, the VPCF may use the UE multiple access capability information to indicate the capability of the VPLMN to support the multiple access.

In response to the message received from the VPCF, the HPCF may take one or more actions. In an example action, based on the information received from the VPCF, the HPCF may determine home URSP rule, home ATSSS rule and/or accepted QoS information for multiple access for the UE. For example, the HPCF may determine a home URSP rule and/or a home ATSSS rule based on the information received from the VPCF. For example, the HPCF may determine a home URSP rule and/or a home ATSSS rule based on the UE multiple access capability information. For example, the HPCF may determine a home URSP rule and/or a home ATSSS rule based on the UE MA-PDU capability indication. For example, the HPCF may determine a home URSP rule and/or a home ATSSS rule based on the UE ATSSS capability indication. For example, the home URSP rule and/or the home ATSSS rule determined by the HPCF may comprise home multiple access information. The home multiple access information may comprise at least one of: a home network MA-PDU capability indication; a home network ATSSS capability indication; a home priority of MA-PDU; a home priority of MPTCP; or a home priority of ATSSS-LL. For example, the home network MA-PDU capability indication may indicate that the home network may support the MA PDU session. The home network ATSSS capability indication may indicate that the home network may support MPTCP feature/function/protocol and/or ATSSS-LL feature/function. The home priority of MA-PDU, the home priority of MPTCP, and/or the home priority of ATSSS-LL may indicate the home network preference/priority of multiple access. For example, the home network may set the home priority of MA-PDU as 1 (e.g. highest priority), set the home priority of MPTCP as 2, and set the home priority of ATSSS-LL as 3 (e.g. lowest priority), to indicate the VPLMN and/or the UE to apply multiple access based on the priority (e.g. the home network prefer to the MA-PDU compare to the MPTCP and/or ATSSS-LL). For example, based on the visited QoS capability received from the VPCF and/or local operator policy and/or UE subscription information, the HPCF may determine accepted QoS information for multiple access for the UE. For example, the allowed GFBR is 20 Mbits in the subscription information and the GFBR of visited QoS capability is 10 Mbits, the HPCF may determine GFBR of accepted QoS to 10 Mbits which may be supported by the VPLMN.

In an example action, the HPCF may send a response message (e.g. policy response) to the VPCF. The policy response message may comprise the home URSP rule, home ATSSS rule and/or the accepted QoS information. In response to the message received from the HPCF, the VPCF may determine a network URSP rule and/or network ATSSS rule based on the home URSP rule and/or the home ATSSS rule. For example, the network URSP rule and/or the network ATSSS rule determined by the VPCF may comprise network multiple access information. The network multiple access information may comprise at least one of: a network MA-PDU capability indication; a network ATSSS capability indication; a priority of MA-PDU; a priority of MPTCP; or a priority of ATSSS-LL. For example, the network MA-PDU capability indication may indicate that the network (e.g. VPLMN and/or the HPLMN) may support the MA PDU session. The network ATSSS capability indication may indicate that the network (e.g. VPLMN and/or the HPLMN) may support MPTCP feature/function/protocol and/or ATSSS-LL feature/function. The priority of MA-PDU, the priority of MPTCP, and/or the priority of ATSSS-LL may indicate the network (e.g. VPLMN and/or the HPLMN) preference/priority of multiple access. In an example, the network URSP rule may be the same as the home URSP rule. In an example, the network URSP rule may be different from the home URSP rule. In an example, the network ATSSS rule may be the same as the home ATSSS rule. In an example, the network ATSSS rule may be different from the home URSP rule. In an example action, the VPCF may send to the AMF a response message (e.g. AM policy establish response). The AM policy establish response message may comprise the network URSP rule, network ATSSS rule and/or the accepted QoS information. In response to the message received from the VPCF, the AMF may send to the UE a message (e.g. registration accept message) comprising the network URSP rule, network ATSSS rule and/or the accepted QoS information.

Figure 19:
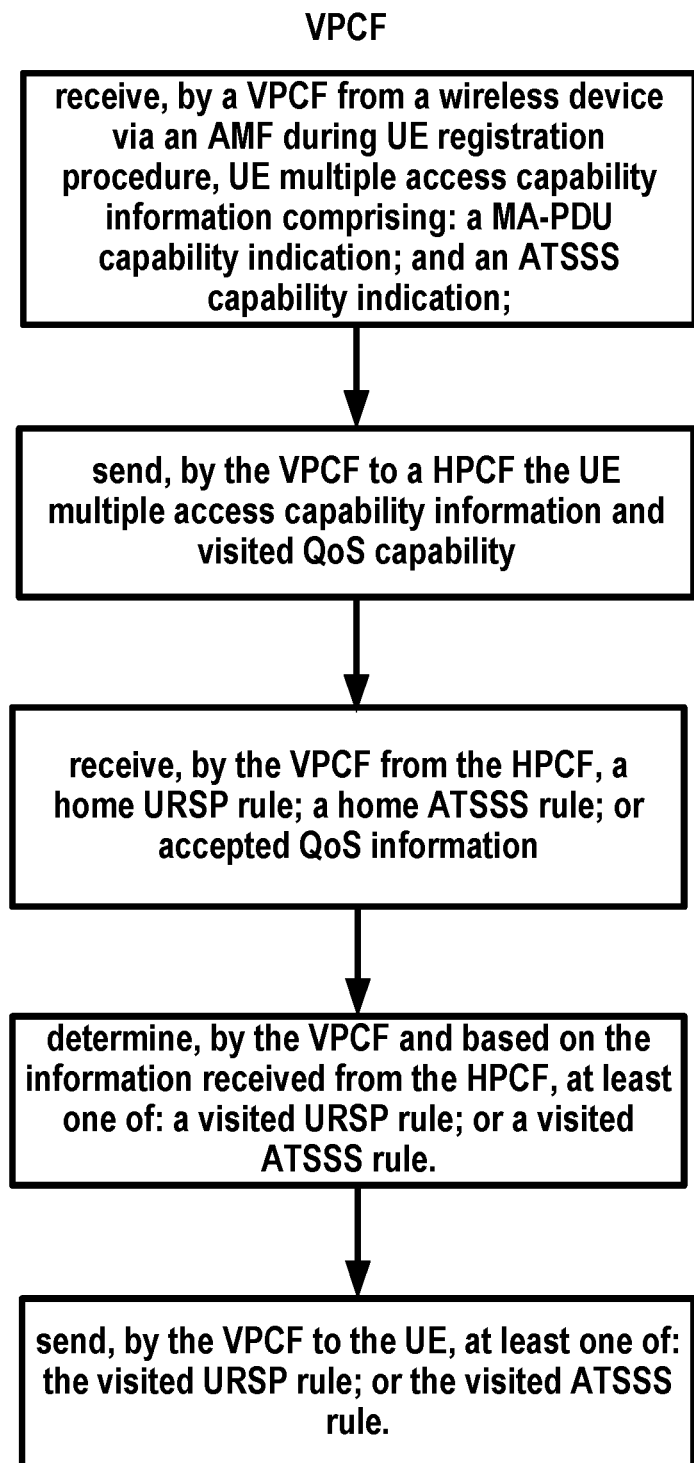
FIG. 19 is an example diagram depicting the procedures of VPCF as per an aspect of an embodiment of the present disclosure.
Figure 20:
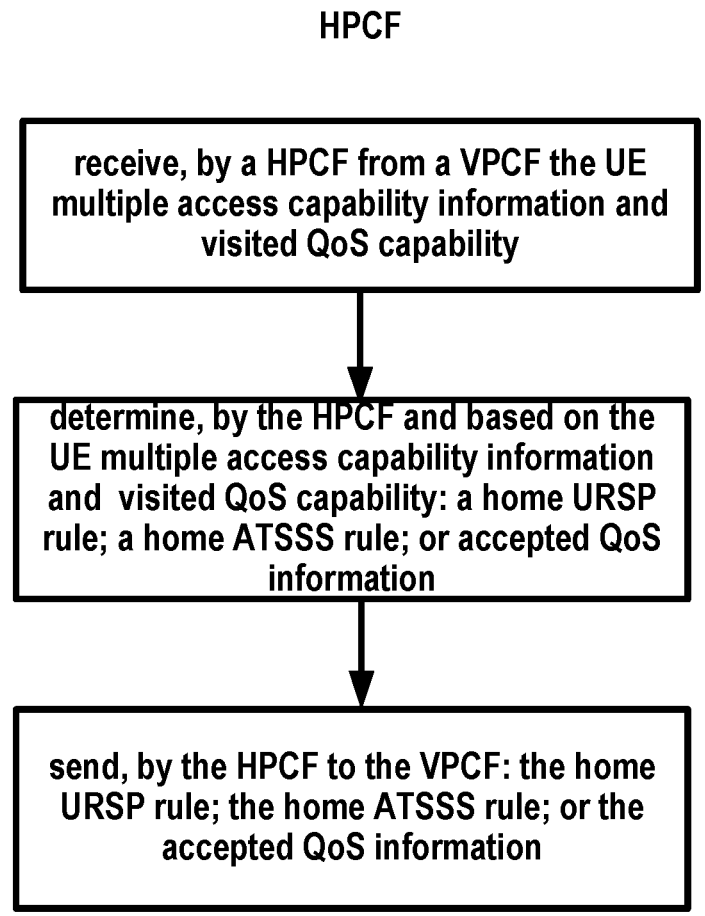
FIG. 20 is an example diagram depicting the procedures of HPCF as per an aspect of an embodiment of the present disclosure.

In response to the message received from the AMF, the UE may take one or more actions. For example, the UE may initiate a MA PDU session based on the network URSP rule, network ATSSS rule and/or the accepted QoS information, and the UE may apply MPTCP and/or ATSSS-LL to the MA PDU session. For example, the UE may initiate a single PDU session based on the network URSP rule, network ATSSS rule and/or the accepted QoS information, and the UE may apply MPTCP and/or ATSSS-LL to the single PDU session. For example, the UE may initiate a MA PDU session based on the network multiple access information and/or the accepted QoS information, and the UE may apply MPTCP and/or ATSSS-LL to the MA PDU session. For example, the UE may initiate a single PDU session based on the network multiple access information and/or the accepted QoS information, and the UE may apply MPTCP and/or ATSSS-LL to the single PDU session. For example, the UE may initiate a MA PDU session based on the network MA-PDU capability indication and/or the network ATSSS capability indication and/or the accepted QoS information, and the UE may apply MPTCP and/or ATSSS-LL to the MA PDU session. For example, the UE may initiate a single PDU session based on the network MA-PDU capability indication and/or the network ATSSS capability indication and/or the accepted QoS information, and the UE may apply MPTCP and/or ATSSS-LL to the single PDU session. For example, based on the priority of MA-PDU, the priority of MPTCP, and/or the priority of ATSSS-LL, the UE may initiate a MA PDU session. For example, based on the priority of MA-PDU, the priority of MPTCP, and/or the priority of ATSSS-LL, the UE may initiate a MA PDU session, and apply MPTCP and/or ATSSS-LL to the multiple PDU session. For example, based on the priority of MA-PDU, the priority of MPTCP, and/or the priority of ATSSS-LL, the UE may initiate a single PDU session and may apply MPTCP and/or ATSSS-LL to the single PDU session. For example, the UE may initiate a PDU session based on the accepted QoS information (e.g. the QoS of the PDU session does not exceed the accepted QoS information). FIG. 19 is an example diagram depicting the procedures of (V)PCF as per an aspect of an embodiment of the present disclosure. FIG. 20 is an example diagram depicting the procedures of HPCF as per an aspect of an embodiment of the present disclosure.

Figure 21:
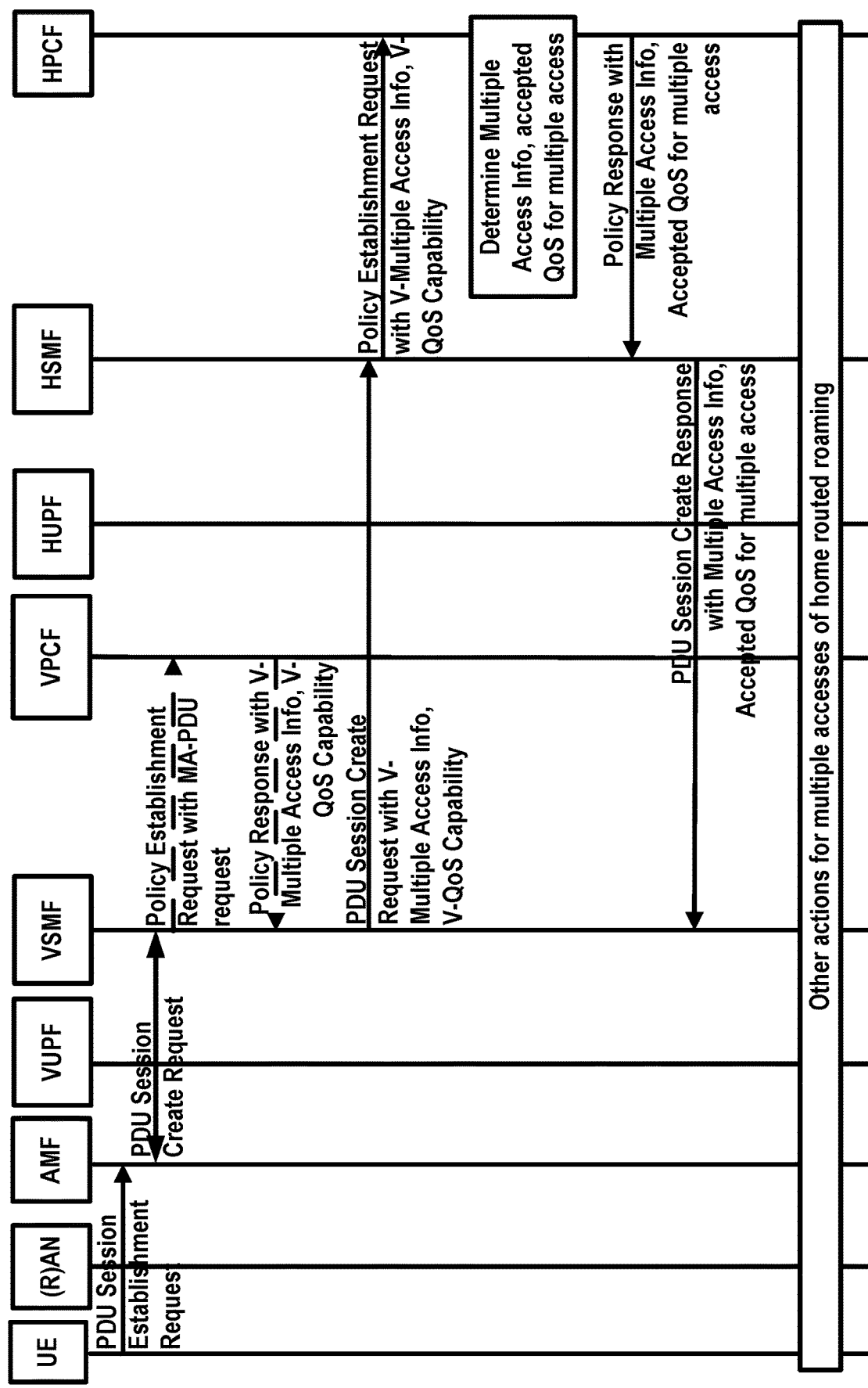
FIG. 21 is an example call flow as per an aspect of an embodiment of the present disclosure.

FIG. 21 shows example call flows that may comprise one or more actions. In an example, a UE may receive a service request from an application on the UE, the service request may indicate requesting a PDU session applying multiple access (e.g. MA PDU, MPTCP, ATSSS-LL). In response to the service request, based on the URSP rule and/or ATSSS rule (e.g. URSP rule and/or ATSSS rule received from a PCF during UE registration procedure), the UE may determine a MA PDU session to support the requested application.

The UE may send to the AMF a NAS message requesting a PDU session. The NAS message may comprise at least one of: a MA PDU request indication; an ATSSS capability (e.g. the ATSSS capability may comprise an MPTCP capability and/or an ATSSS-LL capability); a PDU session ID; a S-NSSAI and/or NSI ID(s) of the S-NSSAI; a DNN; or N1 SM container (PDU session establishment request). The UE may initiate a UE requested PDU session establishment procedure by transmitting a PDU session establishment request message within the N1 SM container of the NAS message. The PDU session establishment request message may comprise at least one of: the MA PDU request indication; the ATSSS capability; the PDU session ID; the S-NSSAI and/or NSI ID(s) of the S-NSSAI; the first packet filter for a first direction (e.g. packet filter for uplink), the second packet filter for a second direction (e.g. packet filter for downlink), Requested PDU Session Type, or a Requested SSC mode, etc. The MA PDU request indication and/or ATSSS capability may indicate to the network that this PDU session establishment request is to establish a new MA PDU session and to apply the ATSSS-LL functionality, or the MPTCP functionality, or both functionalities, for steering the traffic of this MA PDU session.

In response to the NAS message received from the UE, the AMF may determine a home routed roaming scenario based on the user subscription information. The AMF may select a visited SMF (VSMF) and/or a home SMF (HSMF) to support the MA PDU session. The AMF may send to the VSMF a message (e.g. PDUSession_CreateSMContext Request) comprising at least one of: the MA PDU request indication; the ATSSS capability; the PDU session ID; VPLMN S-NSSAI from Allowed NSSAI and the corresponding S-NSSAI of the HPLMN, which is in the mapping the VPLMN S-NSSAI from the Allowed NSSAI, the DNN; the identity of the HSMF, or N1 SM container (PDU session establishment request).

In response to the message received from the AMF, the VSMF may send to a VPCF a message (e.g. policy establishment request) comprising the information received from the AMF (e.g. the MA PDU request indication, and/or the ATSSS capability). In response to the message received from the VSMF, the VPCF may take one or more actions. In an example action, based on information received from the VSMF (e.g. the MA PDU request indication, and/or the ATSSS capability) and/or local operator policy and/or network resource and/or UE subscription information, the VPCF may determine a visited QoS capability for multiple access for the UE, wherein the multiple access may be a MA PDU session, and/or a PDU session using MPTCP, and/or a PDU session using ATSSS-LL. The visited QoS capability may comprise at least one of the following QoS parameters for visited PLMN (VPLMN): 5QI/QCI, ARP, RQA, GFBR, MFBR, Session-AMBR, UE-AMBR, and/or maximum packet loss rate. In an example action, based on information received from the VSMF (e.g. the MA PDU request indication, and/or the ATSSS capability) and/or local operator policy and/or network resource and/or UE subscription information, the VPCF may determine visited multiple access information. The visited multiple access information may comprise at least one of: a visited MA-PDU capability indication; a visited ATSSS capability indication; a visited priority of MA-PDU; a visited priority of MPTCP; or a visited priority of ATSSS-LL. For example, the visited MA-PDU capability indication may indicate that the visited network may support the MA PDU session. The visited ATSSS capability indication may indicate that the visited network may support MPTCP feature/function/protocol and/or ATSSS-LL feature/function. The visited priority of MA-PDU, the visited priority of MPTCP, and/or the visited priority of ATSSS-LL may indicate the visited network preference/priority of multiple access. For example, the visited network (e.g. VPCF) may set the visited priority of MA-PDU as 1 (e.g. highest priority), set the visited priority of MPTCP as 2, and set the visited priority of ATSSS-LL as 3 (e.g. lowest priority), to indicate that the visited network prefer to the MA-PDU compare to the MPTCP and/or ATSSS-LL. In an example action, the VPCF may send to the VSMF a response message (e.g. policy establishment response) comprising the visited QoS capability and/or the visited multiple access information.

In response to the message received from the VPCF, the VSMF may send to the HSMF a message (e.g. PDU session create request). The PDU session create request message may comprise at least one of: the visited QoS capability, the visited multiple access information, the MA PDU request indication, the ATSSS capability, SUPI, GPSI (if available), V-SMF SM Context ID, DNN, S-NSSAI with the value defined by the HPLMN, PDU Session ID, V-SMF ID, V-CN-Tunnel-Info, PDU Session Type, PCO, Number Of Packet Filters, User location information, Access Type, PCF ID, SM PDU DN Request Container, DNN Selection Mode, Always-on PDU Session Requested, AMF ID. In response to the message received from the VSMF, the HSMF may send to a home PCF (HPCF) a message (e.g. policy association establishment request). The policy association establishment request message may comprise the information received from the VSMF (e.g. the visited QoS capability, the visited multiple access information, the MA PDU request indication, and/or the ATSSS capability).

In response to the message received from the HSMF, the HPCF may take one or more actions. In an example action, based on the information received from the HSMF, the HPCF may determine multiple access information and/or accepted QoS information for multiple access for the UE. The multiple access information may comprise at least one of: a network MA-PDU capability indication; a network ATSSS capability indication; a priority of MA-PDU, a priority of MPTCP, or a priority of ATSSS-LL. For example, the network MA-PDU capability indication may indicate that the network (e.g. VPLMN and/or HPLMN) may support the MA PDU session. The network ATSSS capability indication may indicate that the network (e.g. VPLMN and/or HPLMN) may support MPTCP feature/function/protocol and/or ATSSS-LL feature/function. The priority of MA-PDU, the priority of MPTCP, and/or the priority of ATSSS-LL may indicate the network (e.g. VPLMN and/or HPLMN) preference/priority of multiple access. For example, based on the local operator policy and/or home network resource and/or visited multiple access information and/or the MA PDU request indication and/or the ATSSS capability, the HPCF may determine the multiple access information. For example, the local policy may indicate that the home network may support MA PDU session and MPTCP, the visited multiple access information may indicate that the visited PLMN support MA PDU session, MPTCP and ATSSS-LL, the MA PDU request indication and/or the ATSSS capability may indicate UE requests a MA PDU session and has the MPTCP capability, the HPCF may determine the multiple access information comprising: a network MA-PDU capability indication, and/or a network ATSSS capability indication indicating that the network (e.g. VPLMN and/or HPLMN) supports MPTCP feature/function/protocol. For example, the visited multiple access information may indicate that the visited PLMN prefer to a MA PDU session rather than MPTCP and/or ATSSS-LL, the HPCF may determine the priority of MA-PDU has the highest priority in the multiple access information. For example, based on the visited QoS capability received from the VSMF and/or local operator policy and/or UE subscription information, the HPCF may determine accepted QoS information for multiple access for the UE. For example, the allowed GFBR is 20 Mbits in the subscription information and the GFBR of visited QoS capability is 10 Mbits, the HPCF may determine GFBR of accepted QoS to 10 Mbits which may be supported by the VPLMN. In an example action, based on the local operator policy and/or home network resource and/or visited multiple access information and/or the MA PDU request indication and/or the ATSSS capability, the HPCF may determine ATSSS rule and/or PCC rules for multiple access for the UE.

In an example action, the HPCF may send to the HSMF a message (e.g. policy association establishment response). The policy association establishment response message may comprise at least one of: the multiple access information, the accepted QoS information, the ATSSS rule and/or PCC rule for multiple access for the UE. In response to the message received from the HPCF, the HSMF may send to the VSMF a message (e.g. PDU session creation response). The PDU session creation response message may comprise at least one of: the multiple access information, the accepted QoS information, the ATSSS rule and/or PCC rule for multiple access for the UE. The HSMF may determine user plane rule for multiple access for the UE and send to the user plane rule to a home UPF (HUPF).

In response to the message received from the HSMF, the VSMF may take one or more actions. In an example action, based on the multiple access information, the accepted QoS information, the ATSSS rule and/or PCC rule for multiple access for the UE, the VSMF may determine URSP rule and/or a second ATSSS rule for multiple access for the UE, wherein the second ATSSS rule may be the same as the ATSSS rule. In an example action, the VSMF may determine user plane rule for multiple access for the UE and send to the user plane rule to a visited UPF (VUPF). In an example action, the VSMF may send to the UE a PDU session establishment accept message. The PDU session establishment accept message may comprises at least one of: the multiple access information, the accepted QoS information, the URSP rule, and/or the second ATSSS rule for multiple access for the UE.

In response to the message received from the VSMF, the UE may take one or more actions. For example, the UE may initiate a MA PDU session based on the multiple access information, the URSP rule, the second ATSSS rule and/or the accepted QoS information, and the UE may apply MPTCP and/or ATSSS-LL to the MA PDU session. For example, the UE may initiate a single PDU session based on the multiple access information, the URSP rule, the second ATSSS rule and/or the accepted QoS information, and the UE may apply MPTCP and/or ATSSS-LL to the single PDU session. For example, the UE may initiate a PDU session based on the accepted QoS information (e.g. the QoS of the PDU session does not exceed the accepted QoS information).

According to an example embodiment, a wireless device may send to a policy control function (PCF) via an access and mobility management function (AMF), a registration request message comprising UE session capability information, wherein the UE session capability information may comprise: a UE multiple access packet data unit (MA-PDU) capability indication; or a UE access traffic steering switch and splitting (ATSSS) capability indication. The wireless device may receive from the PCF, a registration accept message comprising a UE route selection policy (URSP) rule for a PDU session of the wireless device, wherein the URSP rule may be determined by the PCF based on the UE session capability information. Based on the URSP rule, the wireless device may send a PDU session establishment request message.

According to an example embodiment, the UE session capability information may comprise a 5GSM core network capability information. According to an example embodiment, the 5GSM core network capability information may comprise at least one of: Ethernet PDU session type supported in EPC indication; Reflective QoS support indication; or Multi-homed IPv6 PDU session support indication. According to an example embodiment, the ATSSS capability indication may comprises at least one of: a UE multipath transmission control protocol (MPTCP) capability indication; or a UE access traffic steering switch and splitting low-layer (ATSSS-LL) functionality capability indication. According to an example embodiment, based on the UE session capability information, the PCF may determine a UE route selection policy (URSP) rule for a PDU session of the wireless device. According to an example embodiment, based on the UE session capability information, the PCF may determine an ATSSS rule for multiple access of the wireless device. According to an example embodiment, the URSP rule may comprise multiple access information. According to an example embodiment, the multiple access information may comprise at least one of: a network MA-PDU capability indication; a network ATSSS capability indication; a priority of MA-PDU; a priority of MPTCP; or a priority of ATSSS-LL. According to an example embodiment, the ATSSS rule may comprise multiple access information. According to an example embodiment, the PCF is a visited PCF (VPCF). According to an example embodiment, based on the UE session capability information and network resource, the VPCF may determine a visited QoS capability for a PDU session for the UE. According to an example embodiment, the VPCF may send to a home PCF (HPCF), at least one of: the UE session capability information; or the visited QoS capability. According to an example embodiment, based on the UE session capability information or the visited QoS capability, the HPCF may determine at least one of: a home URSP rule; a home ATSSS rule; or accepted QoS information for a PDU session for the UE. According to an example embodiment, the home URSP rule and/or home ATSSS rule may comprise home multiple access information, wherein the home multiple access information may comprise at least one of: a home network MA-PDU capability indication; a home network ATSSS capability indication; a home priority of MA-PDU; a home priority of MPTCP; or a home priority of ATSSS-LL. According to an example embodiment, the HPCF may send to the VPCF, at least one of: the home URSP rule; the home ATSSS rule; or the accepted QoS information. According to an example embodiment, based on the information received from the HPCF, the VPCF may determine at least one of: a visited URSP rule; a visited ATSSS rule. According to an example embodiment, the visited URSP rule may comprise network multiple access information. According to an example embodiment, the visited ATSSS rule may comprise network multiple access information. According to an example embodiment, the network multiple access information may comprise at least one of: a network MA-PDU capability indication; a network ATSSS capability indication; a priority of MA-PDU; a priority of MPTCP; or a priority of ATSSS-LL. According to an example embodiment, the wireless device may initiate a MA PDU session based on at least one of: the network URSP rule; the network ATSSS rule; or the accepted QoS information.

According to an example embodiment, during UE registration procedure, a policy control function (PCF) may receive UE session capability information from a wireless device via an access and mobility management function (AMF), wherein the UE session capability information may comprise at least one of: a multiple access packet data unit (MA-PDU) capability indication; or an ATSSS capability indication. Based on the UE session capability information, the PCF may determine, a UE route selection policy (URSP) rule for a PDU session of the wireless device. The PCF may send the URSP rule to the wireless device.

According to an example embodiment, during a UE registration procedure, a policy control function (PCF) may receive UE multiple access capability information from a wireless device via an access and mobility management function (AMF), wherein the UE multiple access capability information may comprise: a multiple access packet data unit (MA-PDU) capability indication; and an access traffic steering switch and splitting (ATSSS) capability indication. Based on the UE multiple access capability information, the PCF may determine: a UE route selection policy (URSP) rule for multiple access of the wireless device; and an ATSSS rule for multiple access of the wireless device. The PCF may send the URSP rule and the ATSSS rule to the wireless device. According to an example embodiment, the ATSSS capability indication may comprise at least one of: a multipath transmission control protocol (MPTCP) capability indication; or an access traffic steering switch and splitting low-layer (ATSSS-LL) functionality capability indication.

According to an example embodiment, during a UE registration procedure, a visited policy control function (VPCF) may receive UE multiple access capability information from a wireless device via an access and mobility management function (AMF), wherein the UE multiple access capability information may comprise: a multiple access packet data unit (MA-PDU) capability indication; and an access traffic steering switch and splitting (ATSSS) capability indication. The VPCF may send to a home PCF (HPCF): the UE multiple access capability information; and visited QoS capability for multiple access. The VPCF may receive from the HPCF at least one of: a home URSP rule; a home ATSSS rule; or accepted QoS information. Based on the information received from the HPCF, the VPCF may determine at least one of: a visited URSP rule; or a visited ATSSS rule. The VPCF may send to the wireless device: the visited URSP rule; and the visited ATSSS rule.

According to an example embodiment, a home policy control function (HPCF) may receive from a visited policy control function (VPCF): UE multiple access capability information; and visited QoS capability for multiple access. Based on the UE multiple access capability information and the visited QoS capability, the HPCF may determine: a home URSP rule; a home ATSSS rule; and accepted QoS information. The HPCF may send to the VPCF: the home URSP rule; the home ATSSS rule; and the accepted QoS information. According to an example embodiment, the UE multiple access capability information may comprise: a multiple access packet data unit (MA-PDU) capability indication; and an access traffic steering switch and splitting (ATSSS) capability indication. According to an example embodiment, the ATSSS capability indication may comprise at least one of: a multipath transmission control protocol (MPTCP) capability indication; or an access traffic steering switch and splitting low-layer (ATSSS-LL) functionality capability indication.

According to an example embodiment, a visited session management function (VSMF) may to a visited policy control function (VPCF), a policy establishment request message comprising: MA PDU request indication; and ATSSS capability. The VSMF may receive from the VPCF, a policy response message comprising: a visited multiple access capability information; and a visited QoS capability information. The VSMF may send to a home session management function (HSMF), a PDU session create request message comprising: the visited QoS capability; the visited multiple access information; the MA PDU request indication; and the ATSSS capability. The VSMF may receive from the HSMF, a PDU session create response message comprising: the multiple access information; and accepted QoS information. Based on the visited multiple access capability information and the multiple access information, the VSMF may determine: a UE route selection policy (URSP) rule for multiple access; and an ATSSS rule for multiple access. The VSMF may send to an access and mobility management function (AMF): the URSP rule; and the ATSSS rule. According to an example embodiment, the UE multiple access capability information may comprise: a multiple access packet data unit (MA-PDU) capability indication; and an access traffic steering switch and splitting (ATSSS) capability indication. According to an example embodiment, the ATSSS capability indication may comprise at least one of: a multipath transmission control protocol (MPTCP) capability indication; or an access traffic steering switch and splitting low-layer (ATSSS-LL) functionality capability indication.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various Examples. If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}.

In this specification, various Examples are disclosed. Limitations, features, and/or elements from the disclosed example Examples may be combined to create further Examples within the scope of the disclosure.

In this specification, various Examples are disclosed. Limitations, features, and/or elements from the disclosed example Examples may be combined to create further Examples within the scope of the disclosure.

In this specification, parameters (Information elements: IEs) may comprise one or more objects, and one of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example, when one or more messages comprise a plurality of parameters, it implies that a parameter in the plurality of parameters is in at least one of the one or more messages, but does not have to be in one of the one or more messages.

Many of the elements described in the disclosed Examples may be implemented as modules. A module is defined here as an isolatable element that performs a defined function and has a defined interface to other elements. The modules described in this disclosure may be implemented in hardware, software in combination with hardware, firmware, wetware (e.g. hardware with a biological element) or a combination thereof, some of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various Examples have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative Examples. Thus, the present Examples should not be limited by any of the above described exemplary Examples. In particular, it should be noted that, for example purposes, the above explanation has focused on the example(s) using 5G AN. However, one skilled in the art will recognize that Examples of the invention may be implemented in a system comprising one or more legacy systems or LTE. The disclosed methods and systems may be implemented in wireless or wireline systems. The features of various Examples presented in this invention may be combined. One or many features (method or system) of one Example may be implemented in other Examples. A limited number of example combinations are shown to indicate to one skilled in the art the possibility of features that may be combined in various Examples to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some examples.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving, by an access and mobility management function (AMF) of a network from a wireless device, a registration request message; and
   sending, by the AMF to the wireless device, a registration accept message comprising an access traffic steering, switching, and splitting (ATSSS) capability indication of the network.

2. The method of claim 1, further comprising receiving, by the AMF from the wireless device, a packet data unit (PDU) session establishment request message.

3. The method of claim 2, wherein the PDU session establishment request message comprises a request for establishment of a multiple access PDU session with the network.

4. The method of claim 2, wherein the PDU session establishment request message comprises a wireless device ATSSS capability indication indicating steering functionalities and steering modes supported by the wireless device.

5. The method of claim 1, wherein the ATSSS capability indication of the network comprises a multipath transmission control protocol (MPTCP) capability indication of the network.

6. The method of claim 1, wherein the ATSSS capability indication of the network comprises an access traffic steering, switching, and splitting low-layer (ATSSS-LL) functionality capability indication of the network.

7. The method of claim 1, wherein the registration request message comprises session capability information of the wireless device.

8. The method of claim 7, wherein the session capability information of the wireless device comprises a wireless device ATSSS capability indication of the wireless device.

9. The method of claim 8, wherein the wireless device ATSSS capability indication comprises at least one of:
   a wireless device multipath transmission control protocol (MPTCP) capability indication; and a wireless device access traffic steering switch and splitting low-layer (ATSSS-LL) functionality capability indication.

10. The method of claim 7, wherein the session capability information comprises multiple access packet data unit (MA-PDU) capability indication of the wireless device.

11. An access and mobility management function (AMF) of a network, the AMF comprising:
one or more processors; and
memory storing instructions that, when executed by the one or more processors, cause the AMF to perform operations comprising:
receiving, from a wireless device, a registration request message; and
sending, to the wireless device, a registration accept message comprising an access traffic steering, switching, and splitting, ATSSS, capability indication of the network.

12. The AMF of claim 11, wherein the instructions further cause the AMF to receive, from the wireless device, a packet data unit (PDU) session establishment request message.

13. The AMF of claim 12, wherein the PDU session establishment request message comprises a request for establishment of a multiple access PDU session with the network.

14. The AMF of claim 12, wherein the PDU session establishment request message comprises a wireless device ATSSS capability indication indicating steering functionalities and steering modes supported by the wireless device.

15. The AMF of claim 11, wherein the ATSSS capability indication of the network comprises a multipath transmission control protocol (MPTCP) capability indication of the network.

16. The AMF of claim 11, wherein the ATSSS capability indication of the network comprises an access traffic steering, switching, and splitting low-layer (ATSSS-LL) functionality capability indication of the network.

17. The AMF of claim 11, wherein the registration request message comprises session capability information of the wireless device.

18. The AMF of claim 17, wherein the session capability information of the wireless device comprises a wireless device ATSSS capability indication of the wireless device.

19. The AMF of claim 18, wherein the wireless device ATSSS capability indication comprises at least one of:
a wireless device multipath transmission control protocol (MPTCP) capability indication; and
a wireless device access traffic steering switch and splitting low-layer (ATSSS-LL) functionality capability indication.

20. The AMF of claim 17, wherein the session capability information comprises multiple access packet data unit (MA-PDU) capability indication of the wireless device.

* * * * *